(12) United States Patent
Tanimizu et al.

(10) Patent No.: US 8,363,034 B2
(45) Date of Patent: Jan. 29, 2013

(54) TOUCH PANEL DEVICE

(75) Inventors: Hiromi Tanimizu, Fukuoka (JP);
Takashi Kitada, Fukuoka (JP); Junichi Suematsu, Fukuoka (JP)

(73) Assignee: Panasonic Corporation, Osaka (JP)

( * ) Notice: Subject to any disclaimer, the term of this patent is extended or adjusted under 35 U.S.C. 154(b) by 153 days.

(21) Appl. No.: 13/080,915

(22) Filed: Apr. 6, 2011

(65) Prior Publication Data

US 2011/0254805 A1 Oct. 20, 2011

(30) Foreign Application Priority Data

Apr. 14, 2010 (JP) ................................. 2010-092910
Apr. 14, 2010 (JP) ................................. 2010-093097
Apr. 14, 2010 (JP) ................................. 2010-093120

(51) Int. Cl.
*G09G 5/00* (2006.01)
(52) U.S. Cl. ..................................... 345/174; 178/18.06
(58) Field of Classification Search .................. 345/173, 345/174; 178/18.01, 18.06
See application file for complete search history.

(56) References Cited

U.S. PATENT DOCUMENTS

| | | | |
|---|---|---|---|
| 7,307,616 B2 | 12/2007 | Katsuhito | |
| 2005/0134260 A1 | 6/2005 | Katsuhito | |
| 2009/0244021 A1 | 10/2009 | Matsuo et al. | |
| 2009/0267916 A1 | 10/2009 | Hotelling | |
| 2009/0322704 A1 | 12/2009 | Anno | |

FOREIGN PATENT DOCUMENTS

| | | |
|---|---|---|
| JP | 63-174120 | 7/1988 |
| JP | 63-147735 | 9/1988 |
| JP | 2-176922 | 7/1990 |
| JP | 4-160624 | 6/1992 |
| JP | 9-179679 | 7/1997 |
| JP | 9-319498 | 12/1997 |
| JP | 2000-284911 | 10/2000 |
| JP | 2004-272365 | 9/2004 |
| JP | 2005-165432 | 6/2005 |
| JP | 2006-12110 | 1/2006 |
| JP | 2006-39927 | 2/2006 |
| JP | 2009-134354 | 6/2009 |
| JP | 2009-169720 | 7/2009 |
| JP | 2009-237673 | 10/2009 |
| JP | 2010-9439 | 1/2010 |

OTHER PUBLICATIONS

Search report from United Kingdom, mail date is Aug. 1, 2011.
Japan Office action (JP Appl. No. 2010-092910), mail date is Oct. 4, 2011.
Japan Office action (JP Appl. No. 2010-093097), mail date is Oct. 4, 2011.

*Primary Examiner* — Regina Liang
(74) *Attorney, Agent, or Firm* — Greenblum & Bernstein, P.L.C.

(57) ABSTRACT

In a touch panel device comprising a panel main body (4) including a grid array of transmission electrodes (2) and reception electrodes (3) and defining a touch surface (51), the transmission electrodes are connected to a transmission unit (5) for sequentially applying a drive signal to the transmission electrodes. A time constant element is connected to each transmission electrode via the corresponding lead wire to adjust an overall time constant of the transmission electrode, the time constant of each time constant element being selected to be greater as the length of the lead wire for the corresponding transmission electrode increases. Thereby, the induction noises induced in the reception electrodes owing to the drive signal conducted through the lead wires leading to the transmission electrodes can be minimized and homogenized among the different transmission electrodes, and the positional variations in the distribution of the sensitivity of touch position detection owing to the variations in the lengths of the lead wires leading to the transmission electrodes can be minimized.

14 Claims, 23 Drawing Sheets

Fig.9
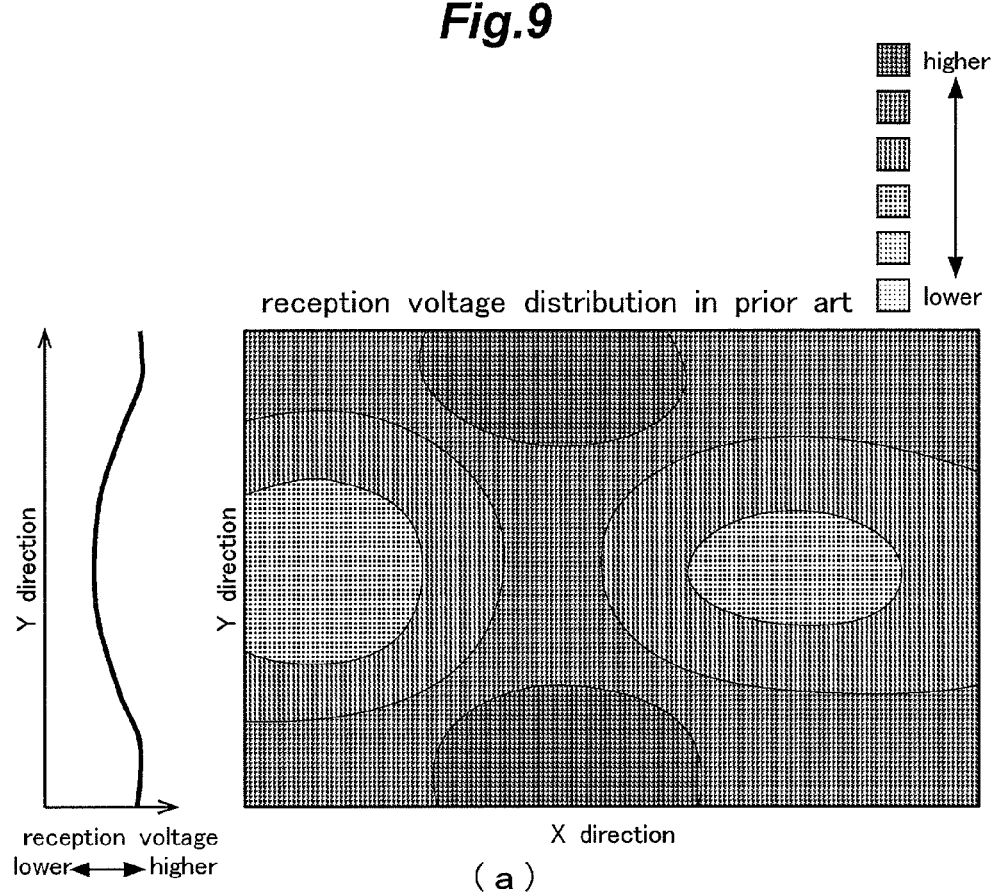
(a) reception voltage distribution in prior art
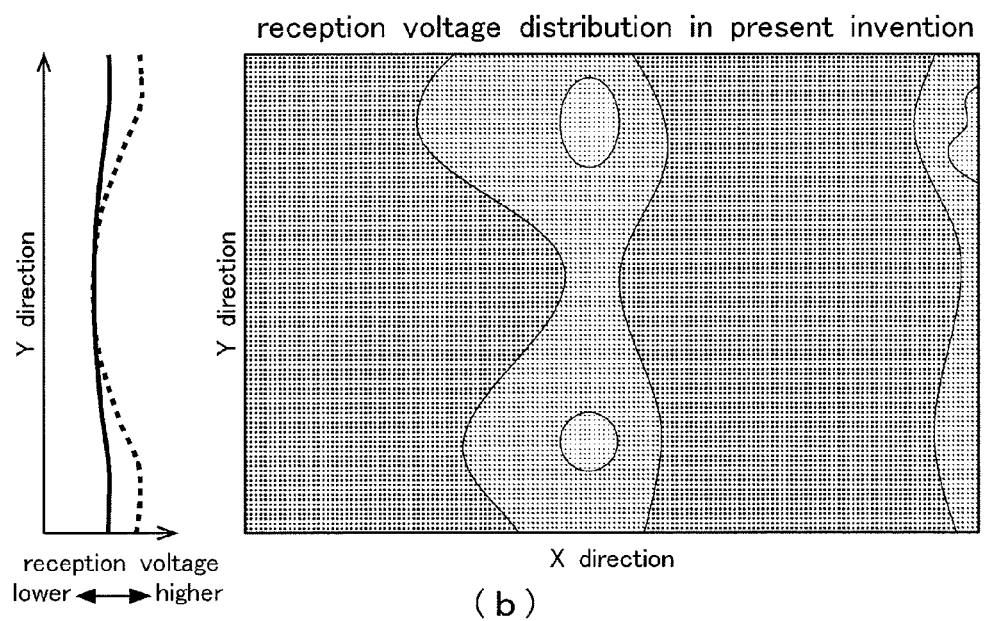
(b) reception voltage distribution in present invention

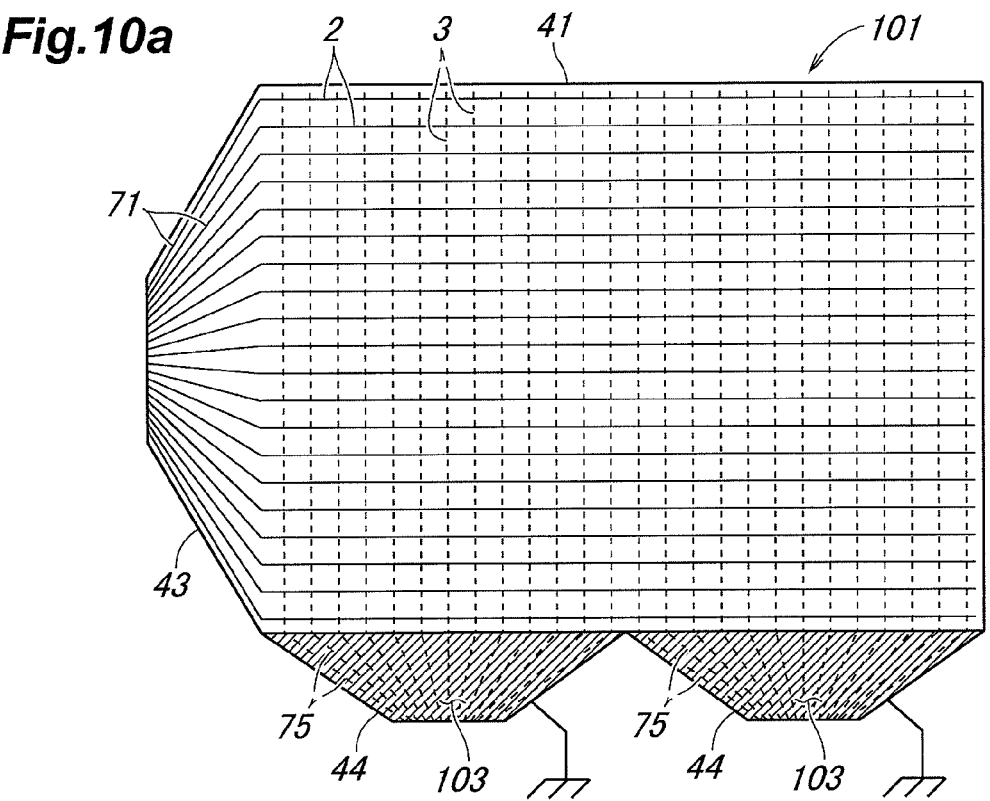
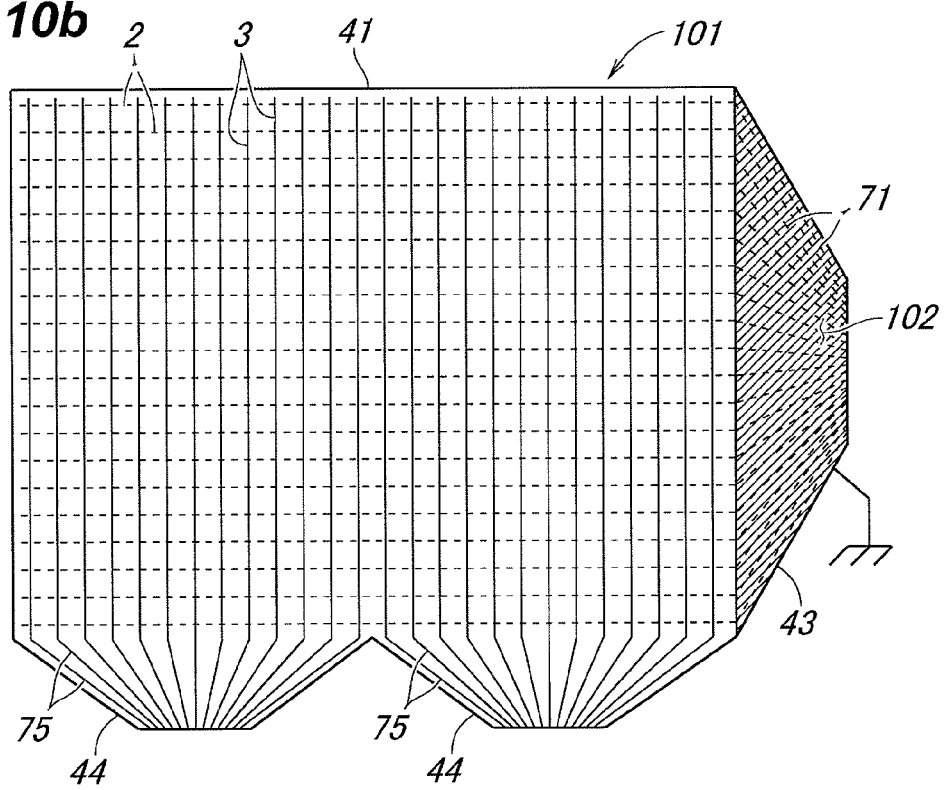

Fig.22

| | | no voltage difference ↓ high speed mode (1st control mode) | low speed mode (2nd control mode) no voltage difference ↓ | duty ratio |
|---|---|---|---|---|
| transmission electrode | select | 0→5V (Vsa: select voltage) | | $\frac{1}{120}$ |
| | non-select | 0V (Vsb: non-select voltage) | | $\frac{119}{120}$ |
| reception electrode | select | 2V (Vra: select voltage) | | $\frac{1}{24}$ |
| | non-select | → 2V (Vrb1: 1st non-select voltage) | 0V ← (Vrb2: 2nd non-select voltage) | $\frac{23}{24}$ |

TOUCH PANEL DEVICE

TECHNICAL FIELD

The present invention relates to a capacitive touch panel device that includes electrodes arranged in a grid matrix and detects a touch position according to a change in an output signal caused by a change in the electrostatic capacitance at an intersection of the electrodes corresponding to the touch position, and in particular to a mutual capacitance based touch panel that detects a touch position by applying a drive signal to each transmission electrode and sensing the charge/discharge current received by each reception electrode.

BACKGROUND OF THE INVENTION

Various types of touch panels based on different working principles are known, and there are those using a large number of electrodes arranged in a panel for detecting a touch by using a resistive membrane or electrostatic capacitor sheet. In such cases, as the electrodes may function as aerial antennas, interferences from external electromagnetic noises may become a problem. In particular, in the case of capacitive touch panels, as the touch location is detected by a minute change in the capacitance near the corresponding electrodes caused by the approach or contact of a conductive object (such as a human body), noises may prevent accurate identification of the touch location, and an effective countermeasure against the problem of noises is desired.

JP 63-174120 (patent document 1) and JP 2010-009439 (patent document 2) disclose a technology for removing noises caused by the display device that is used in conjunction with the capacitive type touch panel device. It was also proposed in JP 2009-237637 (patent document 3) to use a shield wire to protect a capacitive type touch panel device from the influences of external noises. JP 02-176922 (patent document 4) discloses a technology for removing induction noises caused by the induction voltage induced by the user's finger.

The touch panel device is widely used in conjunction with personal computers and personal digital terminals, but may also be used in interactive white boards that are used for presentations and lectures for a large number of audiences in combination with a large screen display device. In such a case, if the touch panel device is of the capacitive type, in particular mutual capacitive type, a plurality of touch positions or multiple touch positions can be detected at the same time, and this enhances the convenience of the touch panel device.

However, as the mutual capacitive type touch panel device is susceptible to external noises as it is designed to detect a touch position by detecting an extremely small current generated in the reception electrode, and therefore involves a high impedance. In particular, as the length of the electrodes is increased owing to the increase in the size of the touch panel device, the problem of external noises become even more acute.

Also, the transmission electrodes are grouped into a number of groups, and each group is connected to an individual transmission circuit board via lead wires. The length of each lead wire increases as the size of the touch panel device increases. If the number of the transmission electrodes in each group is increased with the aim of reducing the number of the transmission circuit boards, a large part of the lead wires inevitably extend in parallel with the reception electrodes. As a result, the electric current of the drive signal that is conducted by the lead wires to be applied to the transmission electrodes may induce an undesirably high induction noises in the reception electrodes. The induction noises that are generated in the reception electrodes caused by the electric current conducted by the lead wires cannot be effectively removed by the conventional arrangement.

Also, the length of each lead wire varies from one another depending on the positions of the transmission electrodes and transmission circuit boards. The greater the distance between the transmission electrode and transmission circuit board is, the greater are the induction noises that are caused in the corresponding lead wire.

BRIEF SUMMARY OF THE INVENTION

In view of such problems of the prior art, a primary object of the present invention is to provide a touch panel device that can reduce the induction noises induced in the reception electrodes owing to the drive signal conducted through lead wires leading to the transmission electrodes.

A second object of the present invention is to provide a touch panel device that can minimize the unevenness in the positional distribution of the sensitivity of touch position detection owing to the variations in the lengths of the lead wires leading to the transmission electrodes.

According to the present invention, such objects can be accomplished by providing a touch panel device, comprising: a panel main body including a grid array of transmission electrodes and reception electrodes and defining a touch surface; a transmission unit configured to apply a drive signal to each transmission electrode; a reception unit configured to receive a charge/discharge current signal generated in each reception electrode in response to the drive signal applied to the transmission electrode, and thereby generate a level signal for each intersection between the transmission electrodes and reception electrodes; and a time constant element connected to each transmission electrode to adjust an overall time constant of the transmission electrode, the time constant of each time constant element being selected to be greater as a length of a lead wire for the corresponding transmission electrode increases.

As the time constant is selected to be greater for the lead wires having greater lengths, the induction noises from those lead wires having greater lengths are preferentially reduced so that not only the overall induction noises induced in the reception electrodes are reduced but also are more evenly distributed over the entire reception electrodes. Thereby, the positional distribution of the sensitivity in the touch position detection can be made more homogenized or uniform.

According to a preferred embodiment of the present invention, the time constant element comprises a CR circuit including a resistive component and a capacitive component. Thereby, the time constant associated with each transmission electrode can be determined as an appropriate value at a high precision. If the transmission electrodes are divided into a plurality of groups, and the transmission electrodes of each group commonly share the same time constant element or the same time constant value, the manufacturing cost can be minimized.

According to another embodiment of the present invention, the panel main body includes an electrode sheet consisting of an electrically insulating support sheet supporting the transmission electrodes and reception electrodes on opposite sides thereof, and the support sheet is provided with an extension that supports lead wires extending from the transmission electrodes on a corresponding side thereof, an electro-conductive layer being formed on a side of the extension opposite from the side supporting the lead wires and electrically grounded so that the time constant element is formed by a part of each lead wire opposing the electro-conductive layer.

Thereby, the need for CR time constant circuits is eliminated, and the manufacturing cost can be reduced. In particular, the longer the length of the lead wire extending along the electro-conductive layer is, the greater is the electrostatic capacitance associated with the lead wire, and hence the CR time constant. Accordingly, the lead wires may extend in a fan-shaped manner on the extension of the support sheet. Alternatively or additionally, the extension may be provided with a trapezoidal shape having a base side connected to a main part of the support sheet, and each lead wire may include an oblique section extending obliquely with respect to the corresponding transmission electrode in a base end region of the extension and a parallel section extending in parallel with the corresponding transmission electrode in a free end region of the extension.

The lead wires may be formed as integral extensions of the transmission electrodes and reception electrodes so that the lead wires may be formed without complicating the manufacturing process or incurring any significant additional costs.

As such an electro-conductive layer additionally serves as an electromagnetic shield, the support sheet may comprise an additional extension supporting lead wires extending from the reception electrodes on a corresponding side thereof, an electro-conductive layer being formed on a side of the additional extension opposite from the side supporting the lead wires and electrically grounded. Thereby, the lead wires for the reception electrodes may be protected from external induction noises.

The electro-conductive layer may comprise a solid layer of electro-conductive material, but may also comprise a mesh layer of electro-conductive material. In the former case, the performance of the electro-conductive layer as an electromagnetic shield may be comparatively high. In the latter case, the material cost may be saved. Furthermore, the electro-conductive layer may be formed by the silk screen printing process or the like in the same way as the electrodes and/or lead wires are formed, and the manufacturing process can be simplified. Also, by suitably selecting the mesh pattern and aperture ratio, a desired CR time constant can be achieved for each lead wire.

According to another preferred embodiment of the present invention, the panel main body comprises an electrode sheet including an electrically insulating support sheet supporting the transmission electrodes and reception electrodes on opposite sides thereof, and an electroconductive back plate laid over a rear surface of the electrode sheet, the transmission unit being attached to a back side of the back plate; and wherein the support sheet is provided with an extension that supports lead wires extending from the transmission electrodes on a corresponding side thereof, and after being bent against the back side of the back plate, is connected to the transmission unit so that the time constant element is formed by a part of each lead wire opposing the back plate.

By bending the extension against the back plate, the lead wires are brought close to the back side of the back plate, and the electrostatic capacitance associated with each lead wire can be increased. The back plate additionally provides the function of an electromagnetic shield. Therefore, the reception electrodes are protected from the inductive influences from the lead wires, and the induction noises in the reception electrodes can be minimized. To further enhance the aforementioned effects, the back plate may be electrically grounded. Also, the ground line for the transmission unit may be conveniently connected to the back plate.

According to a particularly preferred embodiment of the present invention, the extension is provided with a trapezoidal shape having a base side connected to a main part of the support sheet, and each lead wire includes an oblique section extending obliquely with respect to the corresponding transmission electrode in a base end region of the extension and a parallel section extending in parallel with the corresponding transmission electrode in a free end region of the extension; and wherein at least part of the oblique sections of the lead wires are bent against the back side of the back plate.

Thereby, the length of each lead wire can be minimized. Also, the length of each lead wire extending along the back plate is greater as the total length of the lead wire increases, and the effect of emission of induction noises from each lead wire may be reduced more strongly with an increase in the length of the lead wire so that not only the overall induction noises induced in the reception electrodes are reduced but also are more evenly distributed over the entire reception electrodes. Thereby, the positional distribution of the sensitivity in the touch position detection can be made more homogenized or uniform.

The panel main body may further include an intermediate plate interposed between the support sheet and back plate, and the back plate is provided with a side extension extending along a side of the intermediate plate.

The side extension increases the stiffness of the back plate, and thereby increases the resistance of the panel main body against deformation. Furthermore, the length of the lead wires extending along the electro-conductive back plate can be increased, and this allows the induction noises to be reduced in a more effective and selective manner.

BRIEF DESCRIPTION OF THE DRAWINGS

Now the present invention is described in the following with reference to the appended drawings, in which:

FIG. 9 is a graph comparing the reception voltage distribution of the prior art and present invention;

FIGS. 10a and 10b are plan view and rear view of an alternate embodiment of the electrode sheet that may be used in the panel main body shown in FIG. 1;

FIG. 22 is a diagram illustrating the contents of the first and second control modes;

DETAILED DESCRIPTION OF THE PREFERRED EMBODIMENT(S)

Now the present invention is described in the following in more detail in terms of concrete embodiments with reference to the appended drawings.

Figure 1:
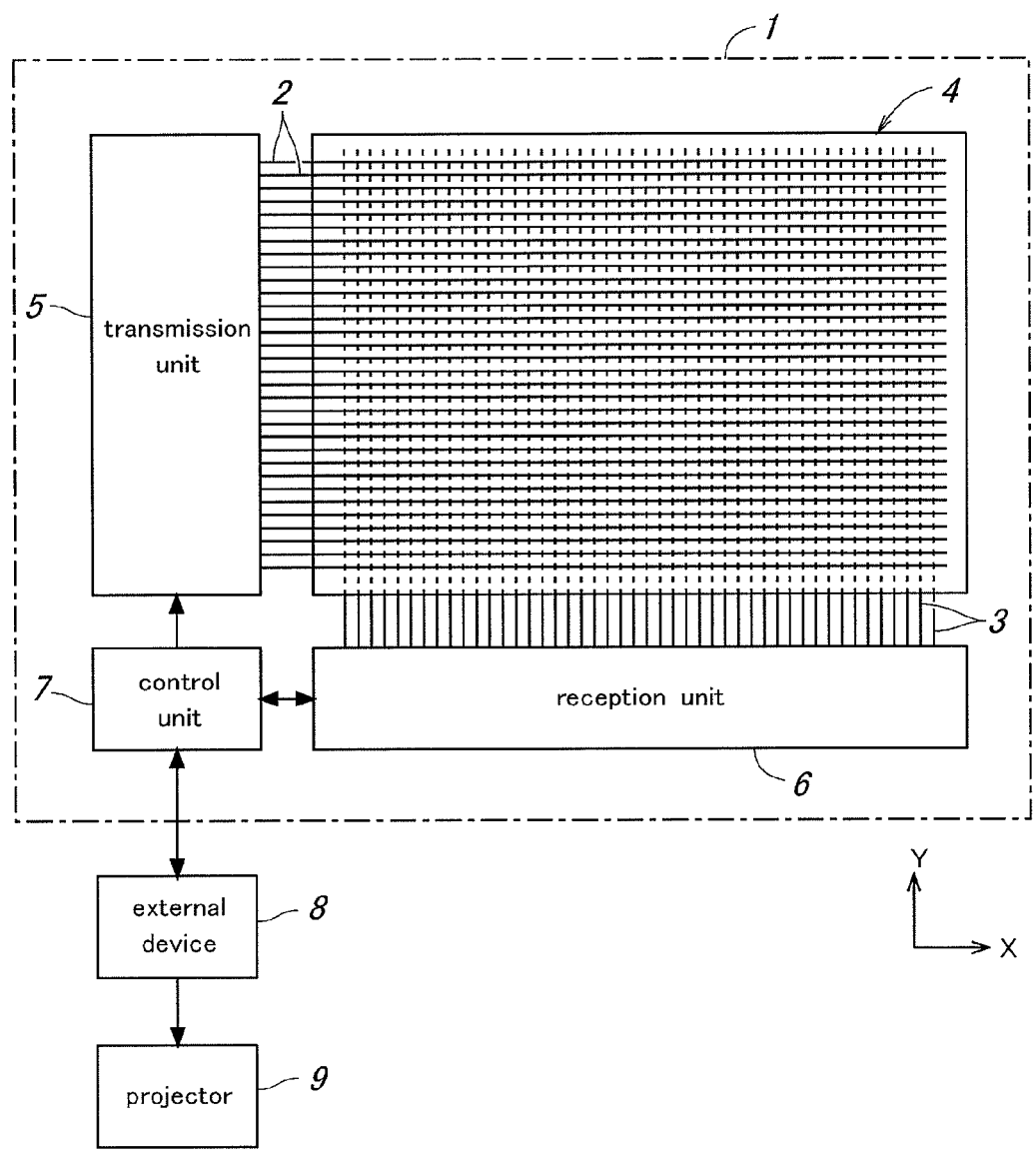
FIG. 1 is a block diagram showing the overall structure of a touch panel device embodying the present invention.

FIG. 1 is a diagram showing the overall structure of a touch panel device embodying the present invention. This touch panel device 1 comprises a panel main body 4 including a grid array of a plurality of transmission electrodes 2 extending in parallel to one another at a regular interval and a plurality of reception electrodes 3 extending perpendicularly to the transmission electrodes also at a regular interval, a transmission unit 5 for feeding a drive signal (pulse signal) to the transmission electrodes 2, a reception unit 6 for receiving the charge/discharge current of the reception electrodes 3 in response to the drive signal applied to the transmission electrodes 2 and producing a level signal for each intersection of the transmission electrodes 2 and reception electrodes 3, and a control unit 7 for detecting a touch position according to the level signal received from the reception unit 6 and controlling the operation of the transmission unit 5 and reception unit 6.

This touch panel device 1 may be used in combination with a large-screen display device or as an interactive white board for presentations and lectures. In the illustrated embodiment, the touch panel device 1 is used in combination with a projector device such that the touch surface of the touch panel device 1 consists of a projector screen.

The touch position information produced from the touch panel device 1 is forwarded to an external device 8 such as a personal computer, and a projector device 9 projects a display image on the touch surface of the touch panel device 1 according to display image data provided by the external device 8. When a user touches a point on the touch surface with his or her finger or an electro-conductive object, this information is forwarded to the external device 8 via the touch panel device 1 so that a button displayed on the touch surface may be operated and/or a prescribed marking may be made on the projected display image. The touch point may also perform the function of an eraser.

The transmission electrodes 2 and reception electrodes 3 are arranged at a same pitch (10 mm, for instance), and the numbers of the electrodes may vary depending on the size and aspect ratio of the touch surface. For instance, the numbers of the transmission electrodes 2 (extending horizontally) and reception electrodes 3 (extending vertically) may 120 and 186, respectively.

The transmission electrodes 2 and reception electrodes 3 are disposed on the two sides of an insulating layer (support sheet) so as to perpendicularly cross each other, and each intersection forms an electrostatic capacitor which reduces the capacitance thereof when a user touches the corresponding touch point or otherwise brings an electro0conductive object adjacent to the touch point so that the touch and the position thereof may be detected.

In the illustrated embodiment, the mutual capacitance technology is used. When a drive signal is applied to one of the transmission electrodes 2, this causes a charge/discharge current to be generated in the reception electrodes 3. A touch of the user changes the electrostatic capacitance of the touch point, and this causes a corresponding change in the charge/discharge current of the affected reception electrodes 3. The change in the charge/discharge current for each intersection is converted into a level signal (digital signal) which is received by the control unit 7 for identifying the touch position. The mutual capacitance technology allows a plurality of touch points to be identified at the same time (multi-touch detection).

Based on the level signal obtained from each intersection received from the reception unit 6, the control unit 7 identifies the touch position (central coordinate of a touch area) by using a prescribed computation process in which the touch position is obtained from a matrix of intersections (4×4, for instance) both in X (extending direction of transmission electrodes 2) and Y (extending direction of reception electrodes 3) directions by using an appropriate interpolation method such as that based on finding a centroid. Thereby, the touch position can be identified at a higher resolution such as 1 mm than the pitch of the transmission electrodes 2 and reception electrodes 3 (10 mm).

Figure 2:
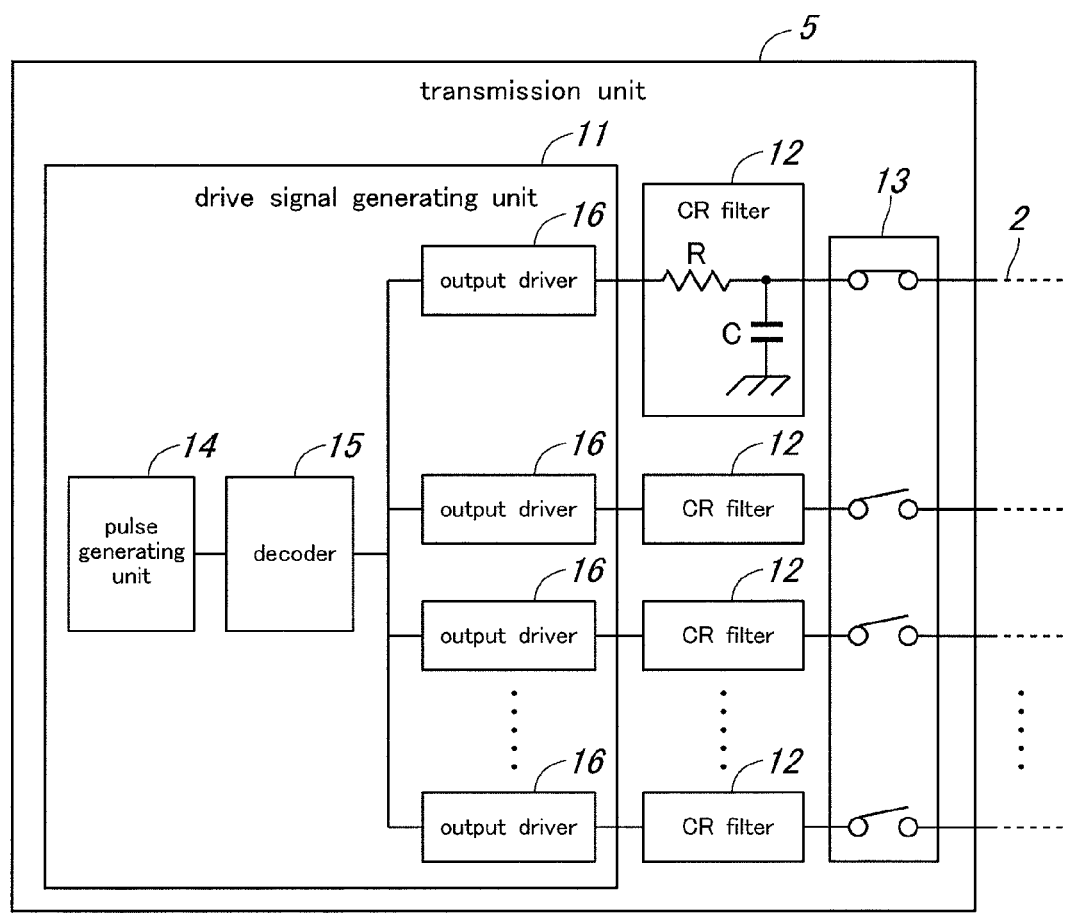
FIG. 2 is a block diagram of the transmission unit shown in FIG. 1.

FIG. 2 is a simplified diagram of the transmission unit 5 shown in FIG. 1. The transmission unit 5 comprises a drive signal generating unit 11, a plurality of CR filters 12 and an electrode selection unit 13. The drive signal generating unit 11 comprises a pulse generating unit 14, a decoder 15 and a plurality of output drivers 16, and is configured to generate a drive signal (pulse signal) in synchronism with a timing signal generated by the control unit 7. The electrode selection unit 13 includes a plurality of switching devices corresponding to the transmission electrodes 2 so that the drive signal generated by the drive signal generating unit 11 can be selectively applied to the different ones of the transmission electrodes 2 one after another.

Each CR filter (CR circuit) 12 includes a resistive element R and a capacitive element C, the resistive element R being connected between an input end and an output end, and the capacitive element C being connected between the output end and ground. These CR filters 12 adjust the CR time constants of the individual transmission electrodes 2 as will be described hereinafter.

Figure 3:
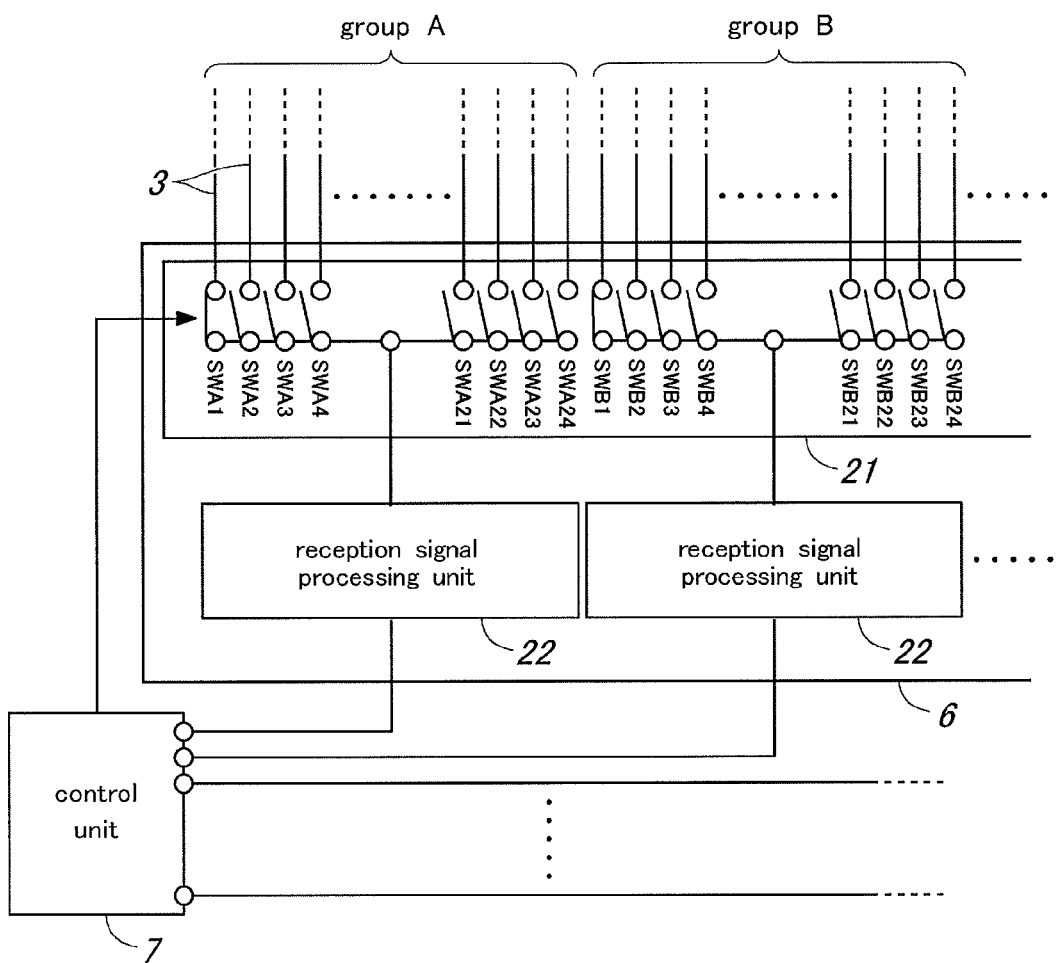
FIG. 3 is a block diagram of the reception unit shown in FIG. 1.

FIG. 3 is a simplified diagram of the reception unit 6 shown in FIG. 1. The reception unit 6 includes an electrode selection unit 21 and a plurality of reception signal processing units 22. The electrode selection unit 21 is provided with a plurality of switching devices SW corresponding to the individual reception electrodes 3 so that the charge/discharge current may be received from the selected reception electrodes 3 one after another while the drive signal is being applied to each one of the transmission electrodes 2 one by one. Thereby, the charge/discharge current can be individually obtained from each and every one of the intersections between the transmission electrodes 2 and reception electrodes 3.

The switching devices SW of the electrode selection unit 21 as well as the reception electrodes 3 are divided into groups each containing a prescribed number (24, for instance) thereof, and the corresponding switching devices SW of the different groups are simultaneously turned on and off. The reception signal processing units 22 are provided so as to correspond to the different groups of the switching devices SW. In each group of the switching devices SW, the switching devices SW are turned on sequentially one after another while the remaining switching devices SW are kept turned off at each instance. Therefore, each reception signal processing unit 22 receives the charge/discharge current of one of the reception electrodes 3 selected by turning on the switching device SW at each instance.

As the switching action of the switching devices SW which are positioned in the corresponding positions in the different groups is performed concurrently, the time required for receiving the charge/discharge current from all of the reception electrodes 3 can be reduced. Also, as the processing of the charge/discharge current is conducted individually for each group in the reception unit 6, the need for large-capacity hardware can be avoided.

The number of the reception electrodes 3 in each group may not be the same. For instance, if there are 186 reception electrodes 3, seven of the groups A to G may each include 24 of them while the last group H includes only 18 of them.

Figure 4:
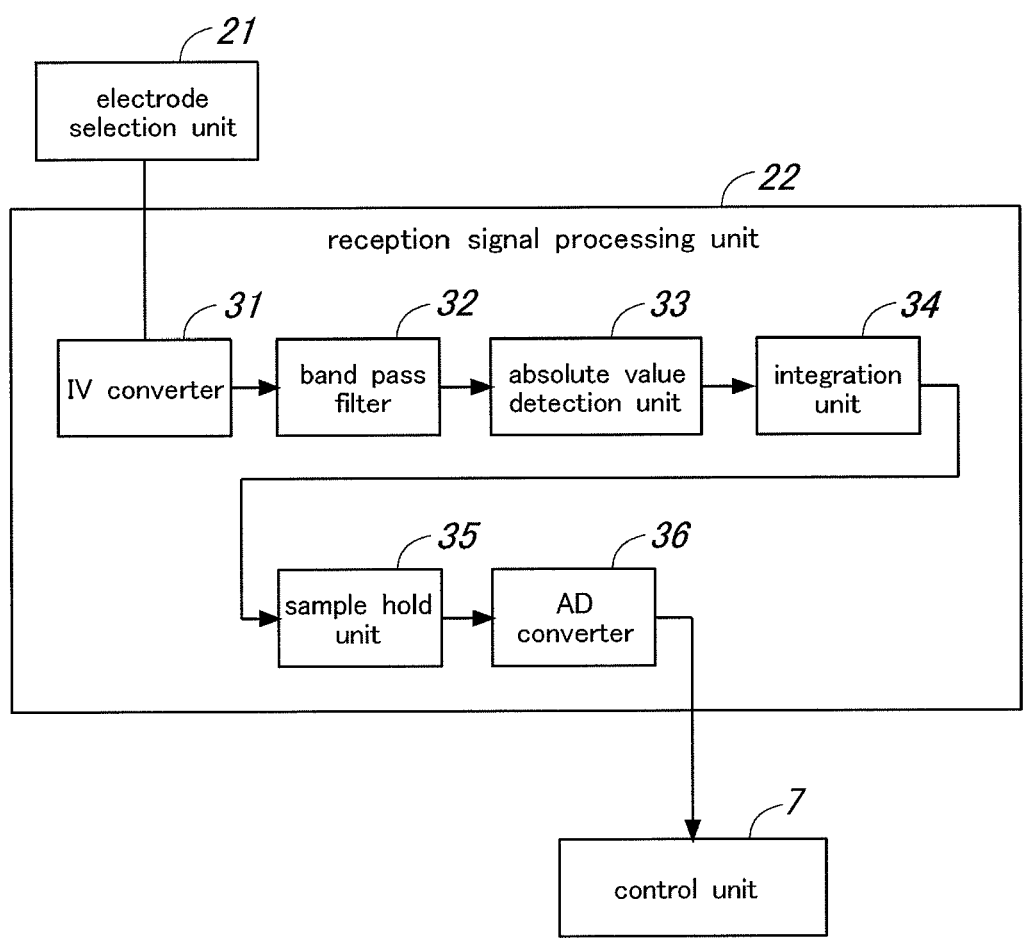
FIG. 4 is a more detailed block diagram of each reception signal processing unit shown in FIG. 3.

FIG. 4 is a simplified diagram of each reception signal processing unit 22 shown in FIG. 3. The reception signal processing unit 22 includes a IV converter 31, a band pass filter 32, an absolute value detection unit 33, an integration unit 34, a sample hold unit 35 and an AD converter 36.

The IV converter 31 converts the charge/discharge current signal (analog signal) of each reception electrode 3 into a voltage signal. The band pass filter 32 removes frequency components other that of the drive signal applied to the transmission electrodes 2. The absolute value detection unit (rectifying unit) 33 performs a full wave rectification of the output signal of the band pass filter 32. The integration unit 34 integrates the output signal of the absolute value detection unit 33 with respect to time. The sample hold unit 35 samples the output signal of the integration unit 34 at a prescribed timing. The AD converter 36 converts the analog output signal of the sample hold unit 35 into a corresponding digital signal (level signal).

Figure 5:
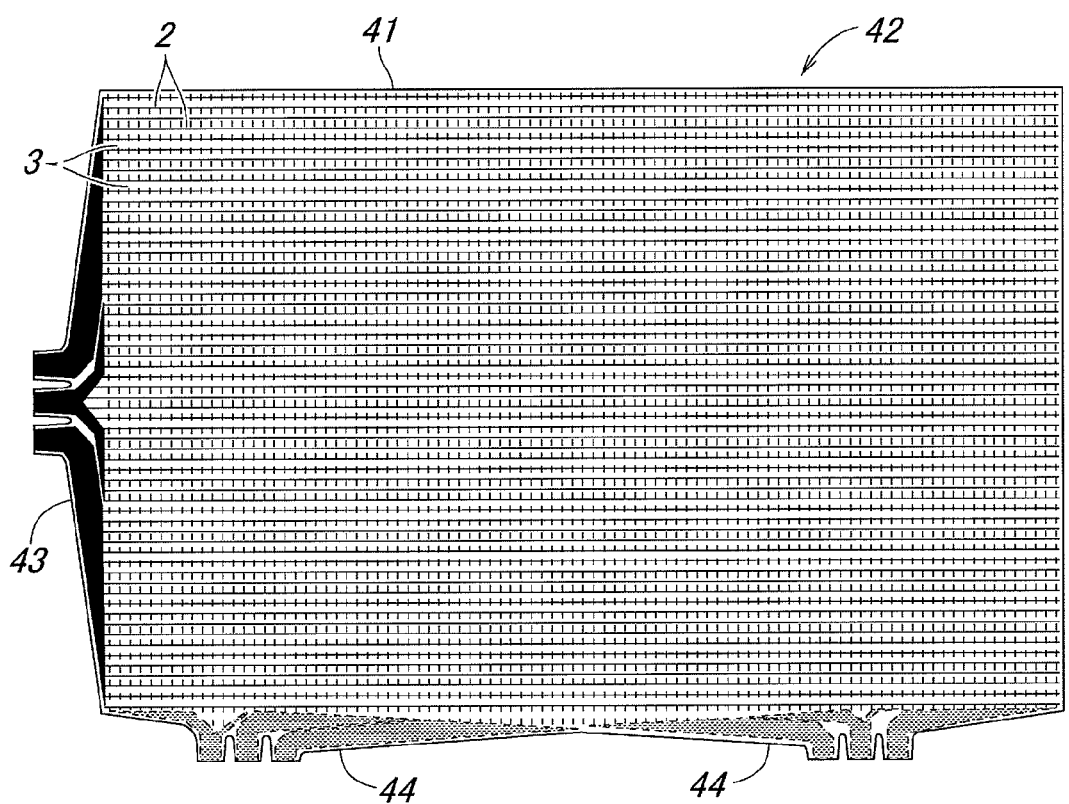
FIG. 5 is a plan view showing the electrode sheet forming the panel main body shown in FIG. 1.

FIG. 5 is a plan view of an electrode sheet 42 forming a main part of the panel main body 4 shown in FIG. 1. The electrode sheet 42 includes, in addition to the transmission electrodes 2 and reception electrodes 3, a flexible plastic support sheet 41 having the transmission electrodes 2 and reception electrodes 3 attached to the two sides thereof, respectively.

The transmission electrodes 2 and reception electrodes 3 may be each provided with a width of 0.6 mm, for instance, and may be formed on the corresponding sides of the support sheet 41 by depositing electrode forming material on the surfaces of the support sheet 41 at a prescribed pattern, and curing the material by using a baking process or the like. The silk screen process is the typical process for depositing the electrode forming material, but other processes such as ink inject printing and nozzle printing processes may also be used.

The electrode forming material typically consists of electro-conductive ink which essentially consists of binder resin material, electro-conductive filler uniformly distributed in the binder resin material, organic solvent that gives the ink the fluidity required for the silk screen printing process, and pigment that gives the ink an appropriate visibility (to enable the state of deposition to be visually ascertained). The electro-conductive filler preferably consists of fine powder of silver or silver paste.

The support sheet 41 serves as an insulating sheet interposed between the transmission electrodes 2 and reception electrodes 3, and is preferably provided with a flexibility in addition to an electrically insulating property. PET (polyethylene terephthalate) is one of the suitable materials for the support sheet 41. The electrostatic capacitance at each intersection can be determined as required by appropriately selecting the thickness of the support sheet 41 which is typically in the order of 0.1 to 0.2 mm.

The electrode sheet 42 is integrally provided with a transmission side lead unit 43 including a plurality of lead wires each connecting the corresponding transmission electrode 2 to the transmission unit 5 and formed on a left side extension of the support sheet 41 (having a trapezoidal or triangular shape with a base side thereof connected to the main part of the support sheet 41). The electrode sheet 42 is integrally provided with a pair of reception side lead units 44 each including a plurality of lead wires each connecting the corresponding reception electrode 3 to the reception unit 6 and formed on a lower extension of the support sheet 41 (also having a trapezoidal or triangular shape with a base side thereof connected to the main part of the support sheet 41).

The lead wires of the transmission side lead unit 43 and reception side lead units 44 may be formed on the support sheet 41 at the same time as forming the transmission electrodes 2 and reception electrodes 3, typically by printing electro-conductive ink on the support sheet 41 by using the silk screen printing process, for instance. In practice, the lead wires may be formed as extensions of the transmission electrodes 2 and reception electrodes 3.

Figure 6:
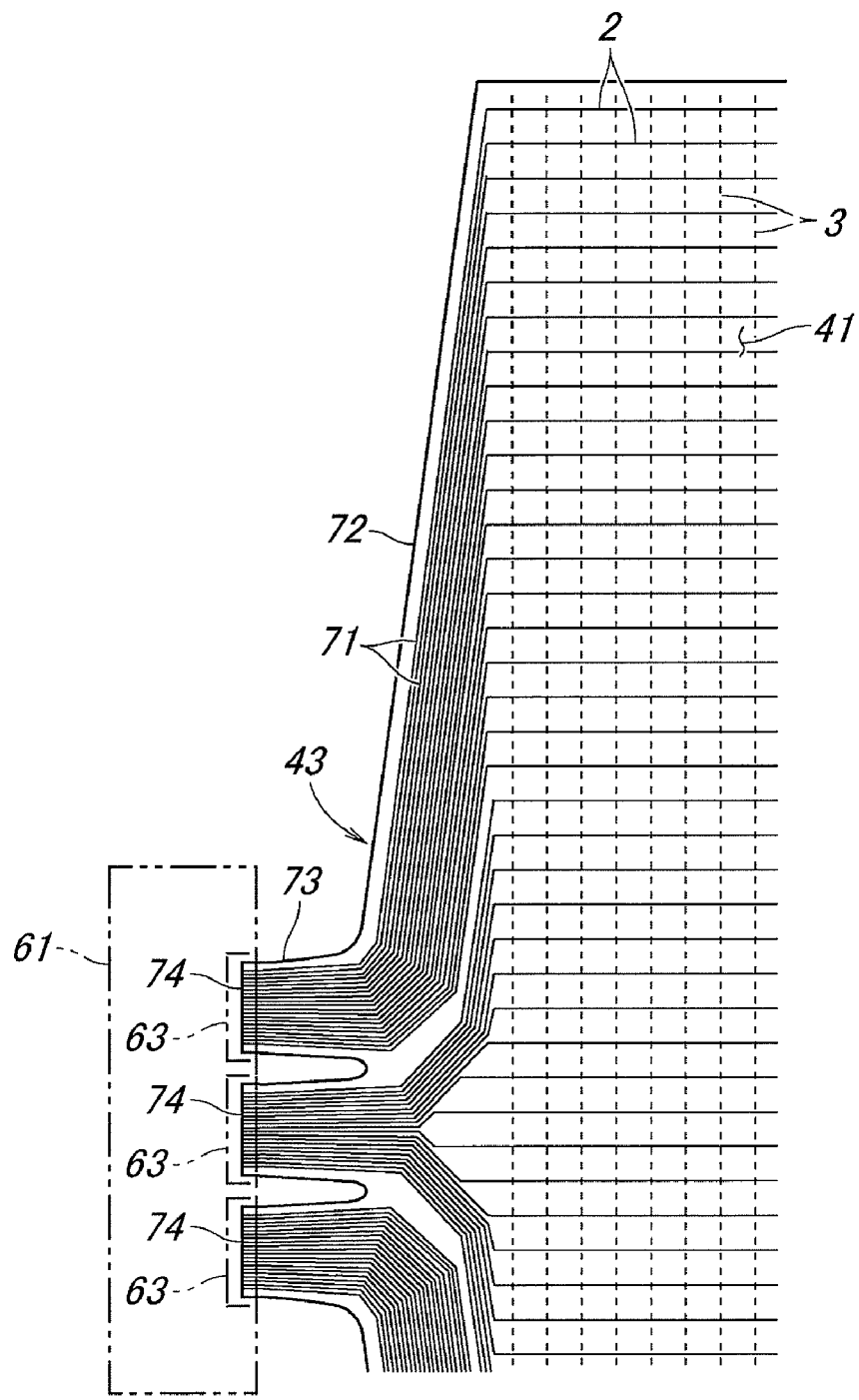
FIG. 6 is an enlarged fragmentary plan view of the transmission side lead unit shown in FIG. 5.

FIG. 6 is an enlarged plan view of the transmission side lead unit 43 of the electrode sheet 42 shown in FIG. 5. FIG. 6 shows the lead wires 71 connecting the transmission electrodes 2 to a transmission circuit board 61. The lead wires 71 extend in parallel to each other from the transmission electrodes 2 so as to define a very small gap between the adjoining lead wires 71, and are grouped into three connecting parts 74 at the free ends thereof. The free ends of the lead wires 71 extend in parallel with the transmission electrodes 2 in each of the connecting parts 74, and each connecting part 74 is fitted into one of three connectors 63 provided on the transmission circuit board 61.

The lead wires 71 extend obliquely as they extend away from the transmission electrodes 2 in the base end region 72 of the support sheet extension, and then bent in parallel with the transmission electrodes 2 in the free end region 73 of the support sheet extension. The base end of each lead wire 71 (or the section thereof adjacent to the corresponding transmission electrode 2) extends obliquely along the side edge of the support sheet 41. Because the lead wire 71 extends substantially in parallel with the reception electrodes 3, the magnetic field created by the drive signal flowing through the lead wire 71 may cause induction noises in the reception electrodes 3.

As shown in FIG. 6, the lead wires 71 extending individually from the transmission electrodes 2 converge into the three connecting parts 74 in the shape of a fan so that the length of each lead wire 71 can be minimized.

The length of each lead wire 71 varies depending on the positional relationship between the corresponding transmission electrode 2 and the transmission circuit board 61, and is greater as the distance between the corresponding transmission electrode 2 and the transmission circuit board 61 increases. In other words, the length of the lead wire 71 is the greatest for those transmission electrodes 2 located at the two extreme positions in the Y-direction, and is the shortest for those transmission electrodes 2 located centrally in the Y-direction.

FIG. 6 shows only the upper half of the electrode sheet 42, and does not show a part of the lower half of the transmission side lead unit 43. As can be readily appreciated, the lower half of the transmission side lead unit 43 is symmetric to the upper half thereof.

Figure 7:
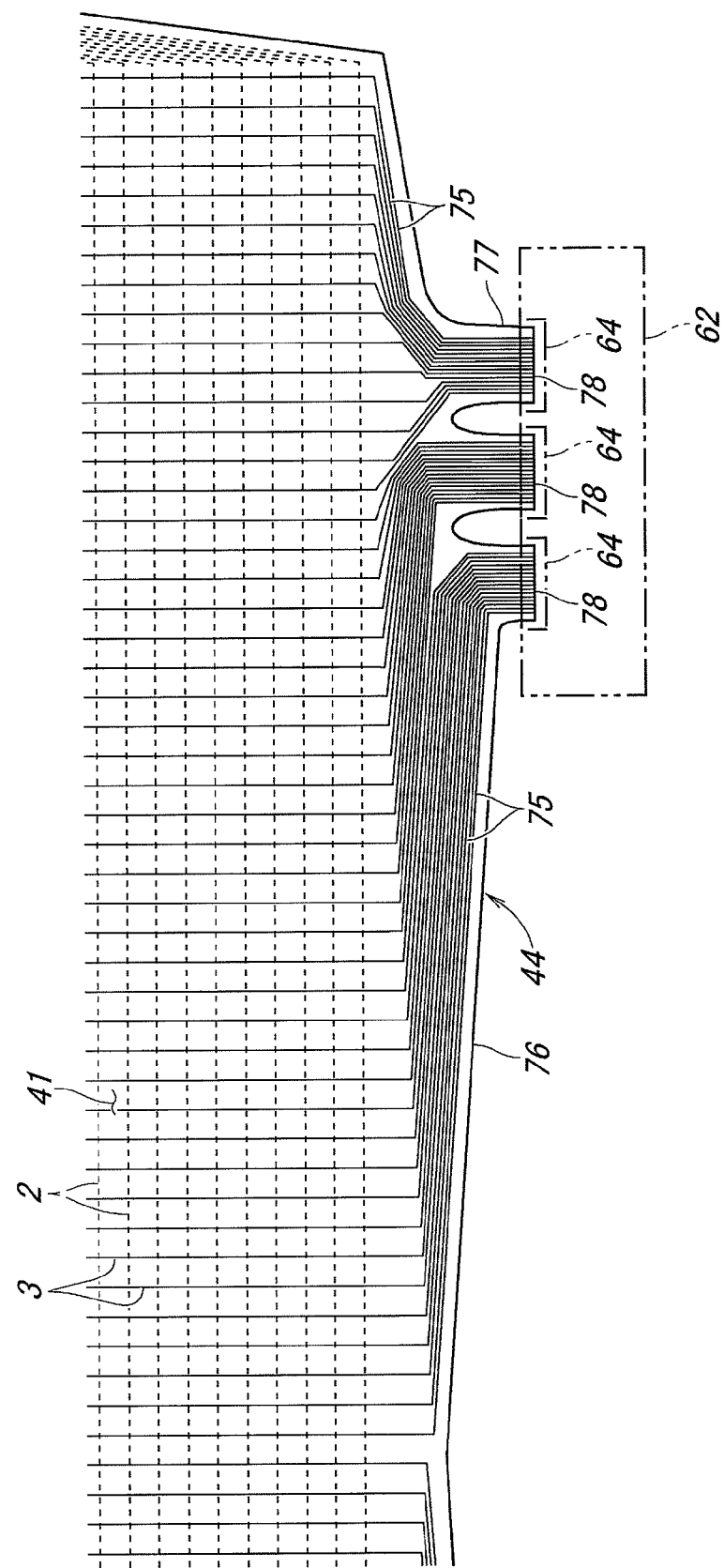
FIG. 7 is an enlarged fragmentary plan view of the reception side lead unit shown in FIG. 5.

FIG. 7 is an enlarge plan view of one of the reception side lead units 44 of the electrode sheet 42 shown in FIG. 5. FIG. 7 shows the lead wires 75 connecting the reception electrodes 3 to a corresponding reception circuit board 62. The lead wires 75 extend in parallel to each other from the reception electrodes 3 so as to define a very small gap between the adjoining lead wires 75, and are grouped into three connecting parts 78 at the free ends thereof. The free ends of the lead wires 75 extend in parallel with the reception electrodes 3 in each of the connecting parts 78, and each connecting part 78 is fitted into one of three connectors 64 provided on the reception circuit board 62.

The lead wires 75 extend obliquely as they extend away from the reception electrodes 3 in the base end region 76 of the support sheet extension, and then bent in parallel with the reception electrodes 3 in the free end region 77 of the support sheet extension. The base end of each lead wire 75 (or the section thereof adjacent to the corresponding reception electrode 3) extends obliquely along the lower edge of the support sheet 41. Because the oblique section of each lead wire 75 extends substantially in parallel with the transmission electrodes 2, the magnetic field created by the drive signal flowing through the transmission electrodes 2 may cause induction noises in the lead wire 75.

As shown in FIG. 7, the lead wires 75 extending individually from the reception electrodes 3 converge into the three connecting parts 78 in the shape of a fan so that the length of each lead wire 75 can be minimized.

FIG. 7 shows only one of the reception side lead units 44, and the other reception side lead unit 44 is symmetric thereto.

Figure 8:
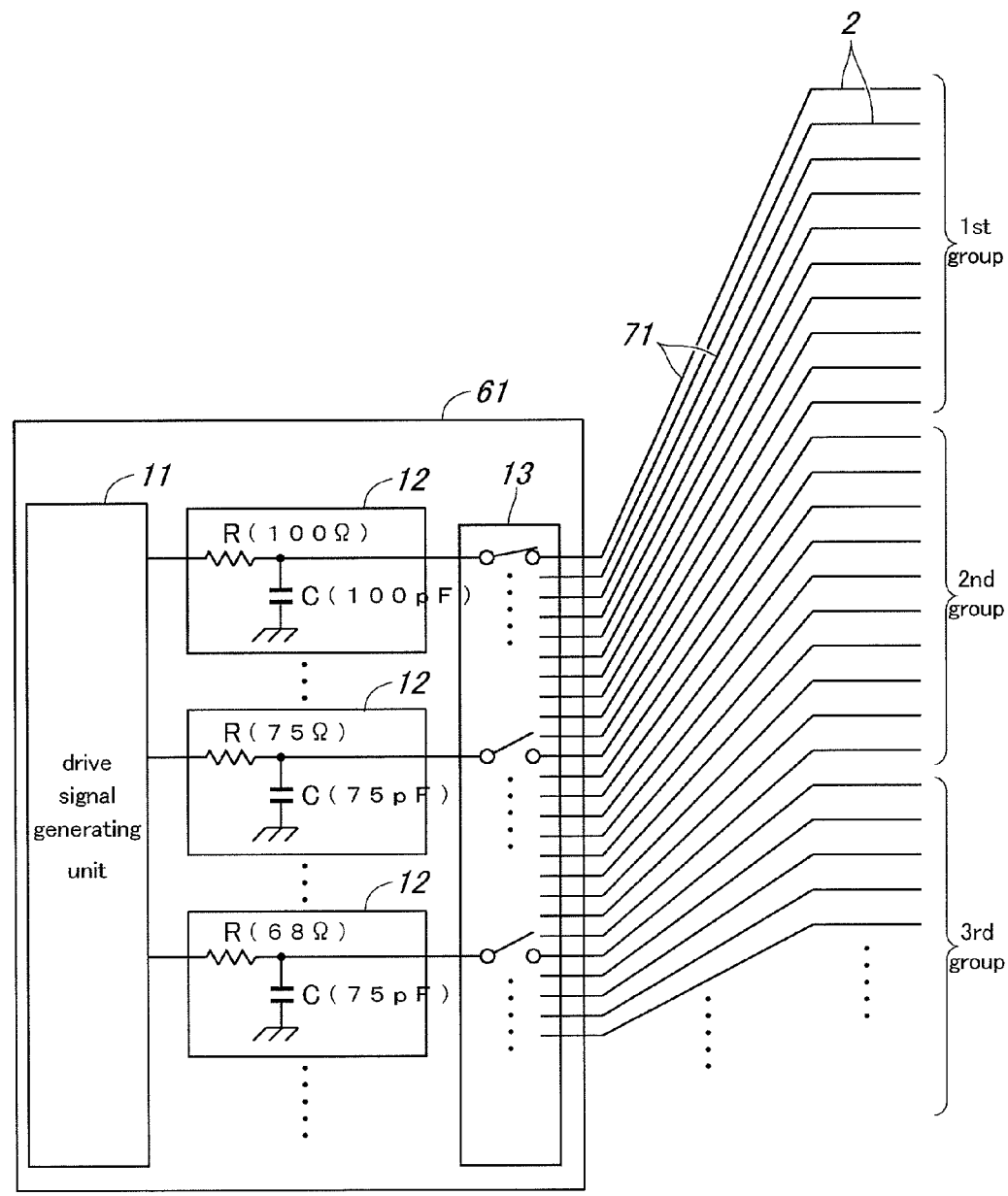
FIG. 8 is a block diagram of the transmission circuit board showing the arrangement for adjusting the CR time constant associated with each lead wire.

FIG. 8 is a diagram showing the arrangement for adjusting the CR time constants of the transmission electrodes 2 by using the CR filters 12 of the transmission unit 5 shown in FIG. 2. Each CR filter 12 is configured to adjust the CR time constant of the corresponding transmission electrode 2 which is determined by the length of the corresponding lead wire 71. The longer the length of the lead wire 71 is, the greater is the time constant of the corresponding transmission electrode 2. The CR time constant T is given by the product of the resistive value of the resistor R and capacitive value of the capacitor C (T=R×C).

As discussed earlier, the length of the lead wire 71 is the greatest for those transmission electrodes 2 located at the two extreme positions in the Y-direction, and is the shortest for those transmission electrodes 2 located centrally in the Y-direction. Therefore, the CR time constant of the CR filter 12 is the greatest for the transmission electrode 2 located at the two extreme positions in the Y-direction, and is the smallest for the transmission electrode 2 located centrally in the Y-direction. The CR time constants of the CR filters 12 intermediate between the two extremes may be progressively varied from on CR filter to another in dependence on the lengths of the corresponding lead wires 71.

By increasing the CR time constant of the CR filter 12 associated with any given transmission electrode 2, the electromagnetic induction caused by the flowing of a drive signal through the corresponding lead wire 71 can be reduced. In the illustrated embodiment, the CR time constant of the CR filter 12 associated with each transmission electrode 2 is increased so as to correspond to the length of the lead wire 71 which is connected to the transmission electrode 2. Therefore, the longer the length of the lead wire 71 is, the greater is the effect of the CR filter 12 connected thereto in reducing the induction noises. Thereby, the electromagnetic induction noises caused by the transmission electrodes 2 can be made uniform among the transmission electrodes 2, and the dependence of the touch sensitivity on the touch position can be minimized.

In the illustrated embodiment, the transmission electrodes 2 are divided into groups of ten, and the transmission electrodes 2 in the same group shares one of the CR filters 12. Therefore, the transmission electrodes 2 of each group or the lead wires 71 thereof use a same resistive value for the resistor component R and the capacitance for the capacitive component C. The resistive value is 100 ohms and the capacitive value is 100 pF for the first group, the resistive value is 75 ohms and the capacitive value is 75 pF for the second group, the resistive value is 68 ohms and the capacitive value is 75 pF for the third group, and so forth.

By thus using the same time constant for each group of transmission electrodes 2, each CR filter 12 can be shared by the transmission electrodes 2 of the corresponding group so that the manufacturing cost can be saved.

(A) in FIG. 9 shows the reception voltage distribution in a conventional arrangement without the CR filters 12 shown in FIG. 2, and (B) in FIG. 9 shows the reception voltage distribution in the illustrated embodiment incorporated with the CR filters 12 shown in FIG. 2. In each case, the graph represents the distribution of the voltage, both in the X direction (in which the reception electrodes 3 are arranged) and Y direction (in which the transmission electrodes 2 are arranged), obtained by IV converting the charge/discharge current signal obtained from each intersection between the reception electrode 3 and transmission electrodes 2 in response to the application of the drive signal (pulse signal) to the transmission electrodes 2.

In the case of the conventional arrangement illustrated in FIG. 9(A), the reception voltage is relatively high in the two extreme regions in the Y direction, and relatively low in the intermediate region in the Y direction. This is due to the fact that the induction noises are greater in the two extreme regions in the Y direction, and smaller in the intermediate region in the Y direction. The difference in the induction noises is due to the difference in the length of the lead wires. The induction noises are greater in the extreme regions in the Y direction which are characterized by relatively long lead wires 71, and are smaller in the intermediate region in the Y direction which is characterized by relatively short lead wires 71.

In the case of the illustrated embodiment in FIG. 9(B), the reception voltage is relatively uniform over the entire extent in the Y direction as compared with the case of FIG. 9(A), although there are some variations depending on the positions. This owes to the use of the CR filters 12 whose time constants are adjusted such that the induction noises are strongly reduced in the extreme regions in the Y direction which are relatively susceptible to induction noises, and are weakly reduced in the intermediate region in the Y direction which is relatively unsusceptible to induction noises. The graphs clearly demonstrate the effectiveness of the use of the CR filters 12 having properly adjusted time constants.

FIGS. 10a and 10b are front side and rear side views, respectively, showing an alternate embodiment of the electrode sheet forming an essential part of the panel main body 4 illustrated in FIG. 1. In FIGS. 10a and 10b, the parts corresponding to those of the previous embodiment are denoted with like numerals without repeating the description of such parts.

This electrode sheet 101 comprises a support sheet 41 having transmission electrodes 2 and reception electrodes 3 formed on the front and rear sides thereof, respectively. The support sheet 41 is provided with a transmission side lead unit 43 including a plurality of lead wires 71 each connecting the corresponding transmission electrode 2 to the transmission unit 5 and formed on a left side extension of the support sheet 41, and a pair of reception side lead units 44 each including a plurality of lead wires 75 each connecting the corresponding reception electrode 3 to the corresponding reception unit 6 and formed on a lower extension of the support sheet 41.

In this embodiment, a dummy conductive layer 102 is formed on the back side of the left side extension of the support sheet 41 opposite to the side on which the transmission side lead wires 71 are formed. Likewise, another dummy conductive layer 103 is formed on the back side of each lower extension of the support sheet 41 opposite to the side on which the reception side lead wires 75 are formed. These dummy conductive layers 102 and 103 are electrically grounded.

The transmission side dummy conductive layer 102 functions as a capacitive component C for the transmission side lead wires 71, and thereby adjust the CR time constant associated with each transmission electrode 2. In particular, the longer the lead wire 71 extends along the transmission side dummy conductive layer 102, the greater the capacitance associated with the lead wire becomes, and hence the greater the time constant associated with the lead wire becomes.

In the illustrated embodiment, the dummy conductive layer 102 extends substantially over the entire area of the left side extension of the support sheet 41 or the transmission side lead unit 43, and each dummy conductive layer is formed on an extension of the support sheet 41 having a trapezoidal shape with a base side thereof connected to the main part of the support sheet 41 so that the CR time constant is determined in dependence on the total length of each lead wire 71. Therefore, in this case also, the greater the length of the lead wire 71 is or the greater the induction noises generated by the lead wire are, the greater is the associated CR time constant, and hence the greater is the effect of reducing the induction noises. Thereby, the induction noises induced in the reception electrodes 3 can be selectively reduced such that the variations of the induction noises from one reception electrode 3 to another can be minimized, and the sensitivity in the touch position detection can be uniformly distributed over the entire touch panel.

The dummy conductive layers 102 and 103 have the additional function of shielding electromagnetic fields, and this also contributes to the reduction in the induction noises generated in the reception electrodes 3. In particular, the transmission side dummy conductive layer 102 is effective in shielding the magnetic field generated around each transmission side lead wire 71, and thereby reducing the induction noises generated in the reception electrodes 3. Likewise, the reception side dummy conductive layer 103 is effective in shielding the magnetic field generated around each transmission electrode 2, and thereby reducing the induction noises generated in the reception side lead wires 75.

By adding the dummy conductive layer 103 to each reception side lead unit 44 in addition to adding the dummy conductive layer 102 to the transmission side lead unit 43, the induction noises are more effectively controlled, and the positional variations in the sensitivity in the touch position detection can be even more effectively minimized. Each dummy conductive layer 102, 103 may consist of either a solid layer of electroconductive material or a mesh of electroconductive material, but a solid layer is more effective in suppressing electromagnetic induction. When a mesh of electroconductive material is used, it is possible to adjust the CR time constant of each transmission electrode 2 by changing the pattern of the mesh and/or the aperture ratio of the mesh.

The electroconductive material for the dummy conductive layers 102 and 103 may consist of any electroconductive material, and may be made of the same material as the transmission electrodes 2 and reception electrodes 3, or as the lead wires 71 and 75. Preferably, the dummy conductive layers 102 and 103 are formed on the support sheet 41 in the same process as that for forming the transmission electrodes 2 and reception electrodes 3. The transmission electrodes 2 and reception electrodes 3 may be formed by the silk screen printing process, but may also be formed by etching the layer of electroconductive material layered on the support sheet 41 in advance. The same is true with the lead wires 71 and 75 and dummy conductive layers 102 and 103.

According to the foregoing embodiment of the present invention, the variations in the sensitivity of touch position detection in the touch panel device due to the differences in the levels of induction noises attributed to the differences in the lengths of the lead wires connecting the transmission electrodes with the transmission circuit board can be minimized. In particular, the present invention is highly beneficial when used in the touch panel devices of the electrostatic capacitive type, in particular the mutual capacitive type touch panel devices.

FIGS. 11 to 14a show a second embodiment of the present invention. In FIGS. 11 to 14a, the parts corresponding to those of the previous embodiment are denoted with like numerals without repeating the description of such parts. The second embodiment is similar to the first embodiment in a large part, and the following description is limited to those parts which are substantially different from those of the first embodiment.

Figure 11:
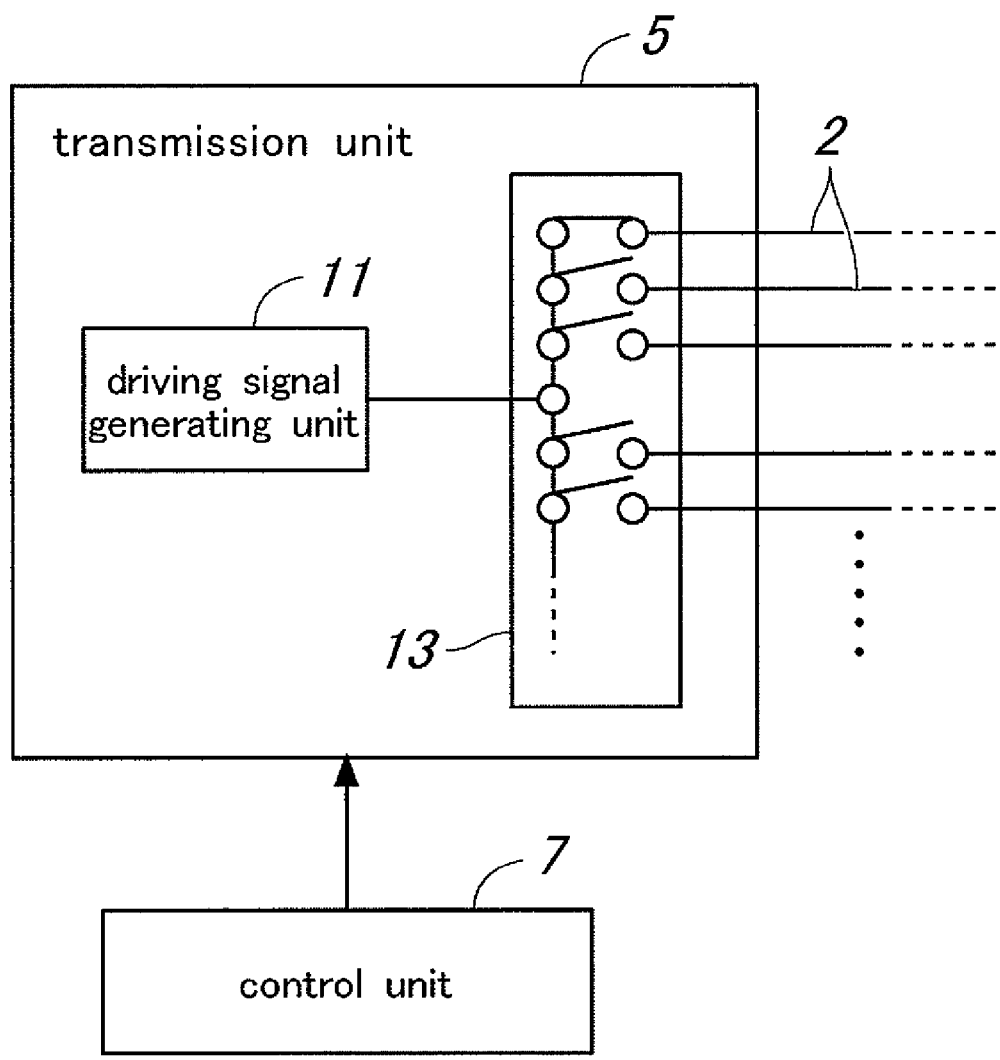
FIG. 11 is a block diagram of the transmission unit of the second embodiment of the present invention.

As shown in FIG. 11, the transmission unit 5 of the second embodiment is provided with a simple structure including a drive signal generating unit 11 and an electrode selection unit 13 but not including the CR filters.

Figure 12:
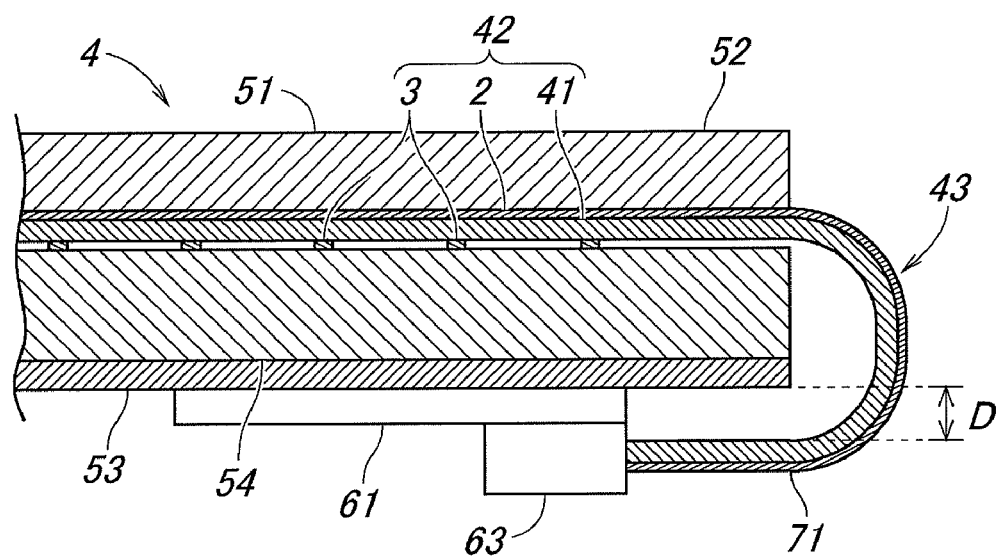
FIG. 12 is a fragmentary sectional view of the panel main body of the second embodiment of the present invention.

FIG. 12 is a cross sectional view of a part of the panel main body 4. The panel main body 4 comprises a surface plate 52 defining a touch surface 51 and overlying the front surface of the electrode sheet 42, an intermediate plate 54 overlying the rear surface of the electrode sheet 42, and a back plate 53 overlying the rear surface of the intermediate plate 54. The surface plate 52 is preferably made of plastic material having a high dielectric coefficient such as melamine resin so that the touch detection sensitivity may be enhanced. The back plate 53 may be made of steel or other metallic material. The intermediate plate 54 may be made of elastic and electrically insulating material such as foamed urethane resin or other plastic material that affords a high bending stiffness and mechanical strength to the panel main body 4 and an electric insulation between the electrode sheet 42 and back plate 53.

Figure 13:
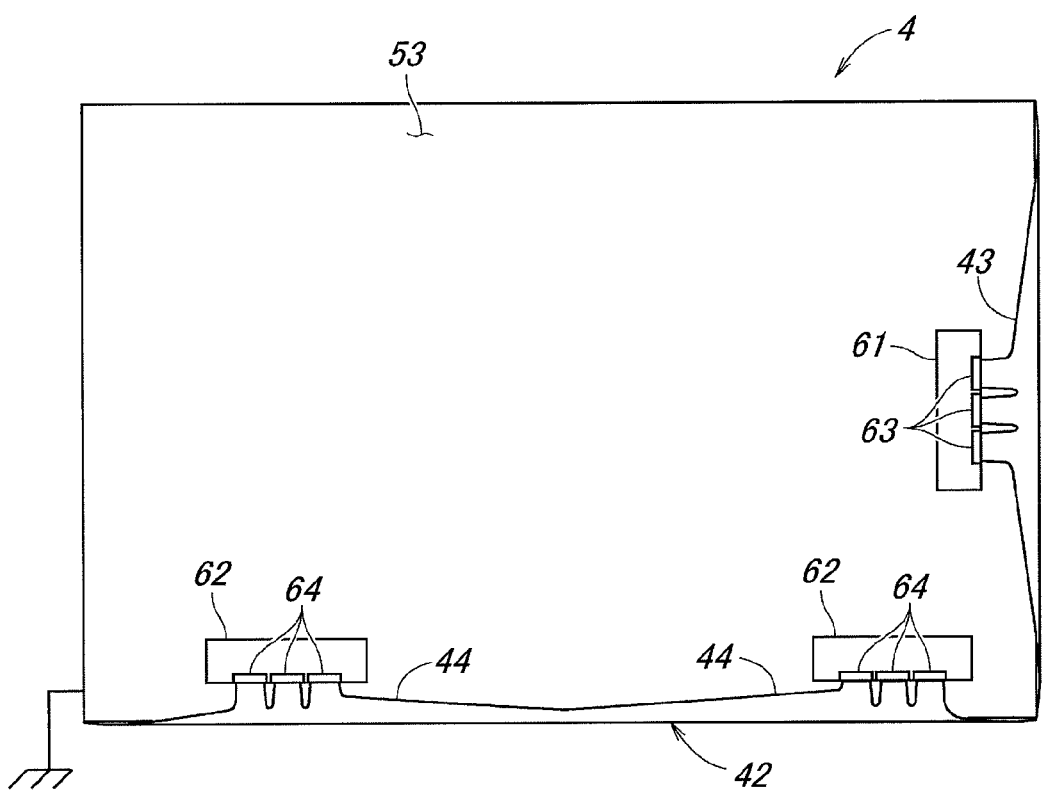
FIG. 13 is a rear view of the electrode sheet of the second embodiment of the present invention.

FIG. 13 is a rear view of the panel main body 4 such as that shown in FIG. 1. The transmission circuit board 61 forming the transmission unit 5 and the two reception circuit boards 62 forming the reception unit 6 are mounted on the back side of the back plate 53. The back plate 53 made of steel or other electro-conductive material is electrically grounded, and the ground lines of the transmission circuit board 61 and reception circuit boards 62 are connected to the back plate 53. As best shown in FIGS. 12 and 13, the transmission side lead unit 43 is folded back against the back side of the back plate 53, and the connecting parts 74 thereof are connected to the corresponding connectors 63 provided on the transmission circuit board 61. As shown in FIG. 13, each reception side lead unit 44 is likewise folded back against the back side of the back plate 53, and the connecting parts 64 thereof are connected to the corresponding connectors 64 provided on the corresponding reception circuit board 62.

As the back plate 53 is made of metallic material such as steel, the overall panel main body 4 is given with a high stiffness and a high mechanical strength, and the reception electrodes 3 are shielded from external induction noises.

By folding back the transmission side lead unit 43 onto the back side of the back plate 52 as shown in FIG. 12, the lead wires 71 thereon are placed adjacent to the electro-conductive back plate 53 so that the electrostatic capacitance associated with each lead wire 71 increases, and this suppresses the inductive action caused by the conductance of the drive signal for the corresponding transmission electrode 2 through the lead wire 71. Therefore, the longer the length of each lead wire extending along the electro-conductive back plate 53 is, the more effectively the induction noises induced in the reception electrodes 3 are suppressed.

In particular, as the transmission side lead unit 43 is provided with a trapezoidal shape, and the lead wires 71 extend at least partly obliquely thereon, the length of the lead wires 71 differ one from another such that the induction noises are more effectively reduced with an increase in the length of the lead wire extending along the electro-conductive back plate 53.

Figure 14A:
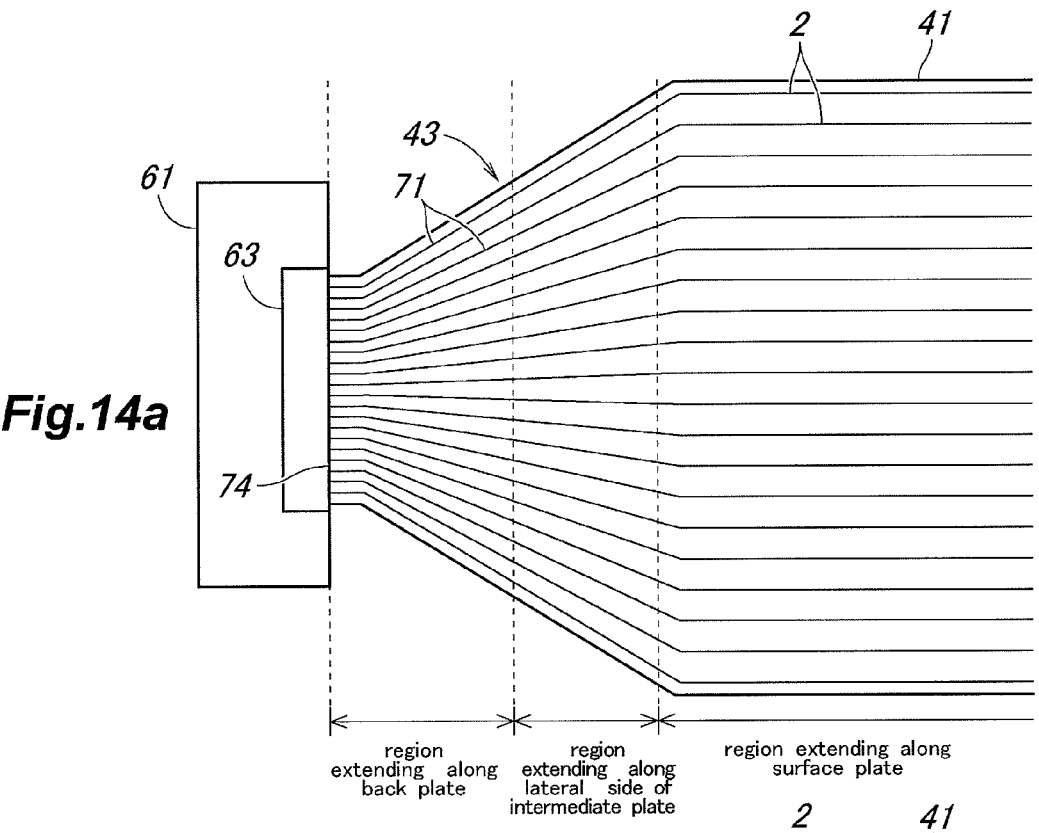
FIG. 14a is a simplified developed plan view of the transmission side lead unit of the second embodiment.

FIG. 14a is a simplified plan view of the transmission side lead unit 43 of the electrode sheet 42 such as that shown in FIG. 5. By folding back the transmission side lead unit 43 on to the back side of the back plate 53, at least a part of the lead wires 71 arranged in the transmission side lead unit 43 in the shape of a fan extend along the back side of the back plate 53. The longer the lead wire is, the greater is the time constant associated with the lead wire, and hence the greater is the effect of reducing the induction noises associated with the corresponding transmission electrode 2. Therefore, the induction noises induced in the reception electrodes 3 can be reduced, and can be made more evenly distributed among the different reception electrodes 3.

Figure 14B:
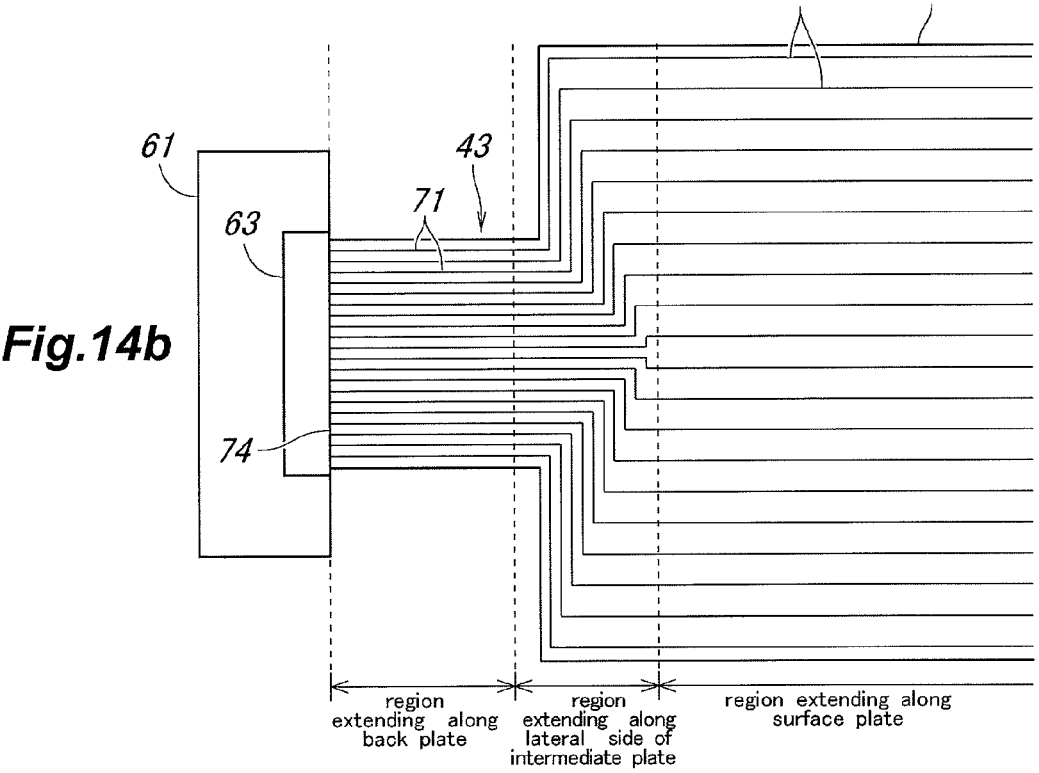
FIG. 14b is a view similar to FIG. 14a showing a modified embodiment of the transmission side unit that can be used for the second embodiment.

FIG. 14b is a simplified plan view of a modified embodiment of the transmission side lead unit 43 of the electrode sheet 42 such as that shown in FIG. 5. In this embodiment, the transmission side lead unit 43 is provided with a rectangular shape, and the lead wires 71 are bent perpendicularly as seen in plan view as they are extended from the corresponding transmission electrodes 2. In this case, the length of each lead wire 71 extending along the back plate 53 when the transmission side lead unit 43 is folded back on to the back side of the back plate 53 is the same for all of the lead wires 71. Therefore, this embodiment does not produce the effect of increasing the effect of suppressing induction noises with an increase in the length of each lead wire as opposed to the embodiment illustrated in FIG. 14a.

Figure 15:
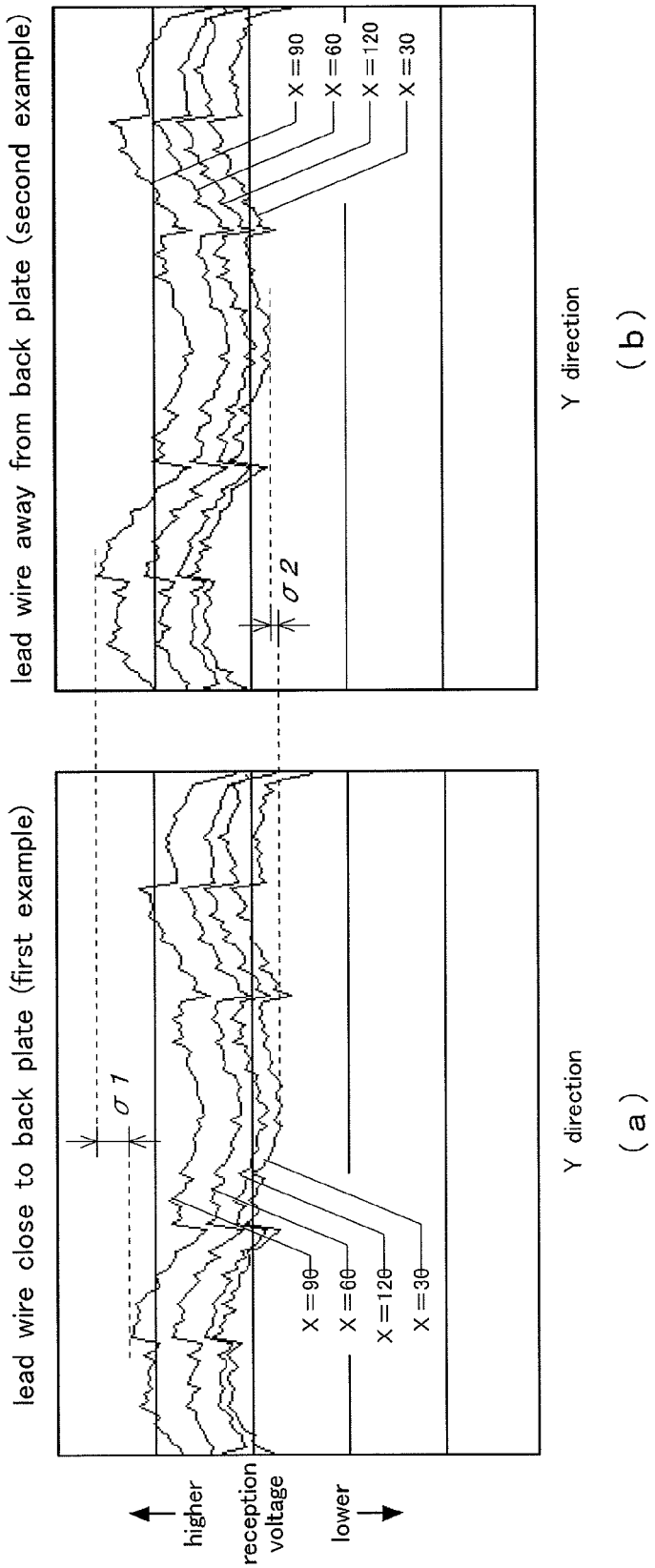
FIG. 15 is a graph showing the difference in the distribution of the reception sensitivity depending on the spacing between the transmission side lead unit and back plate.

FIG. 15 compares the variations in the reception sensitivity depending on the spacing D between the transmission side lead unit 43 and back plate 53 shown in FIG. 12. (A) shows the case where the transmission side lead unit 43 is brought close the back plate 53 (or the lead wires 71 are brought close to the back plate 53) (first example), and (B) shows the case where the transmission side lead unit 43 is kept some distance away from the back plate 53 (or the lead wires 71 are kept some distance away from the back plate 53) (second example). The difference in the spacing D between the two examples is 10 mm (see FIG. 12).

The abscissa in each of the graphs (A) and (B) indicates the position along the Y axis, and the ordinate in each of the graphs (A) and (B) indicates the reception voltage obtained by IV converting the charge/discharge current produced in each reception electrode 3 when a drive signal (pulse signal) is applied to one of the transmission electrodes 2. Each graph shows the reception voltage of each of the 20th, 60th, 90th and 120th reception electrodes 3 (X=30, 60, 90 and 120).

Figure 16:
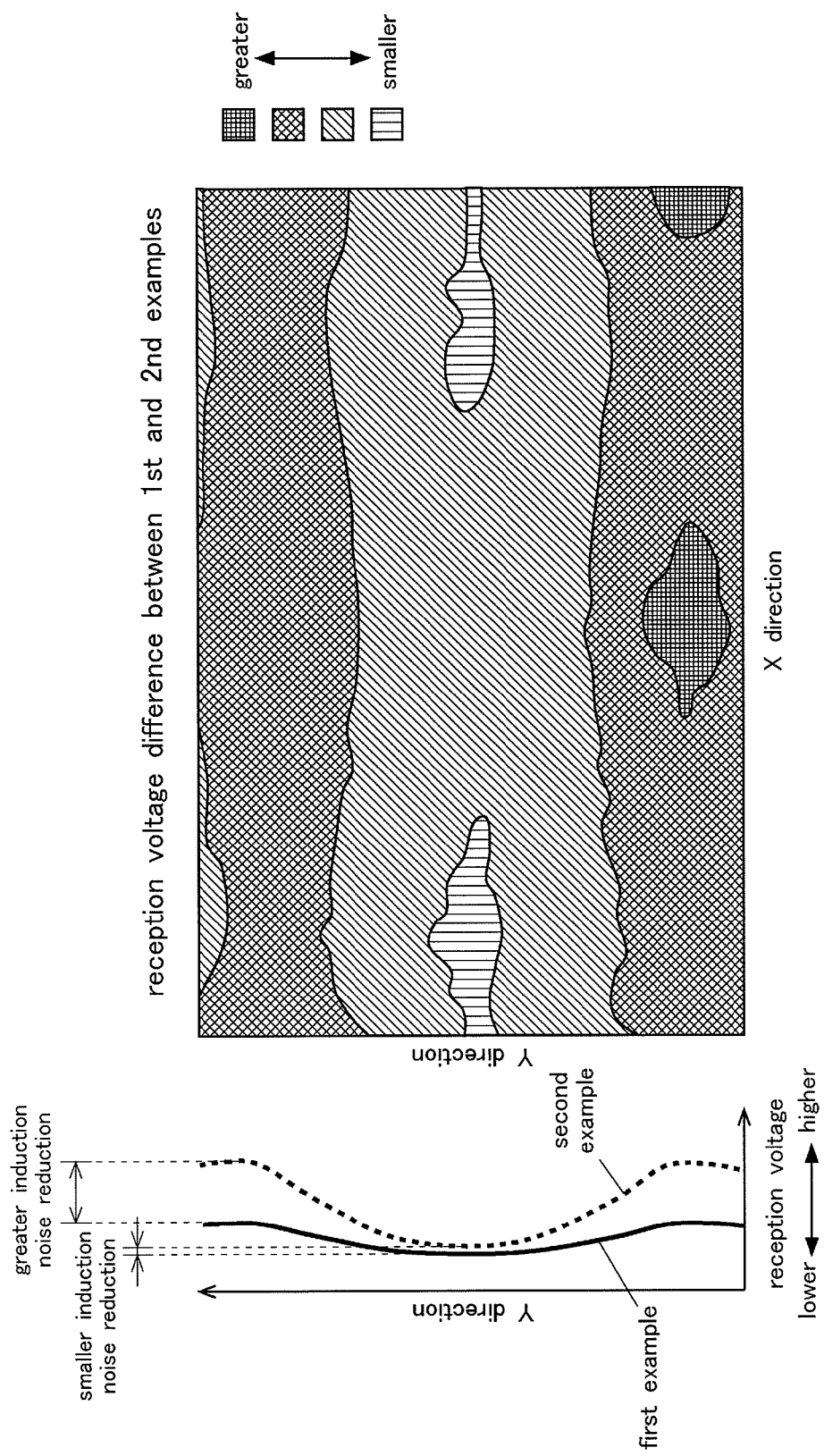
FIG. 16 is a graph showing the effect of improving the positional variations in the distribution of the reception sensitivity of the reception electrodes by bringing the transmission side lead wires close to the back plate.

FIG. 16 is a graph showing the effect of reducing the variations in the reception sensitivity by bringing the transmission side lead wires 71 close to the back plate 53. The graph shows the distribution of the difference σ between the reception voltages of the first example and second example shown in FIG. 15 in both the X direction (in which the reception electrodes 3 are arranged) and Y direction (in which the transmission electrodes 2 are arranged). When the lead wires 71 are placed adjacent to the back plate 53 as shown in (A) of FIG. 11, the reception voltage is generally low. When the lead wires 71 are spaced from the back plate 53 as shown in (B) of FIG. 11, the reception voltage is generally high. It means that the induction noises can be generally reduced by bringing the lead wires 71 close to the back plate 53.

The reception voltage is higher in the two extreme regions in the Y direction (in which the transmission electrodes 2 are arranged), and is lower in the intermediate region. This indicates that the induction noises are greater in the two extreme regions in the Y direction and smaller in the intermediate region. The variations in the induction noises are due to the variation in the length of the lead wire 71 depending on the position thereof in the Y direction. The induction noises are greater in the two extreme regions in the Y direction where the lead wires 71 are relatively long, and are smaller in the intermediate region where the lead wires 71 are relatively short.

In the graphs of FIG. 15, σ1 represents the difference between the highest reception voltage values of the first and second examples in one of the two extreme regions in the Y direction, and σ2 represents the difference between the lowest voltage values of the first and second examples in the intermediate region in the Y direction. σ1 is greater than σ2 (σ1>σ2). This means that the induction noises are strongly reduced in the two extreme regions in the Y direction which involve relatively large induction noises, and are weakly reduced in the intermediate region in the Y direction which involves relatively small induction noises (see FIG. 16).

By bringing the lead wires 71 adjacent to the back plate 63, the induction noises can be reduced. In particular, as the induction noises are more strongly reduced in the regions with respect to the Y direction where the greater induction noises are generated, the induction noises are not only generally reduced but also preferentially reduced in the regions where the induction noises are greater. Thereby, the positional variations in the sensitivity of touch position detection can be minimized.

The electro-conductive back plate 53 has the function of shielding electromagnetic field, and this also contributes to the reduction in the induction noises induced in the reception electrodes 3. More specifically, in the transmission side lead unit 43, the electro-conductive back plate 53 shields the magnetic field generated around each transmission side lead wire 71, and the induction noises induced in the reception electrodes 3 are thereby reduced. In the reception side lead unit 44, the electro-conductive back plate 53 shields the magnetic field generated around each transmission electrode 2, and the induction noises induced in the reception side lead wires 75 are thereby reduced.

Figure 17:
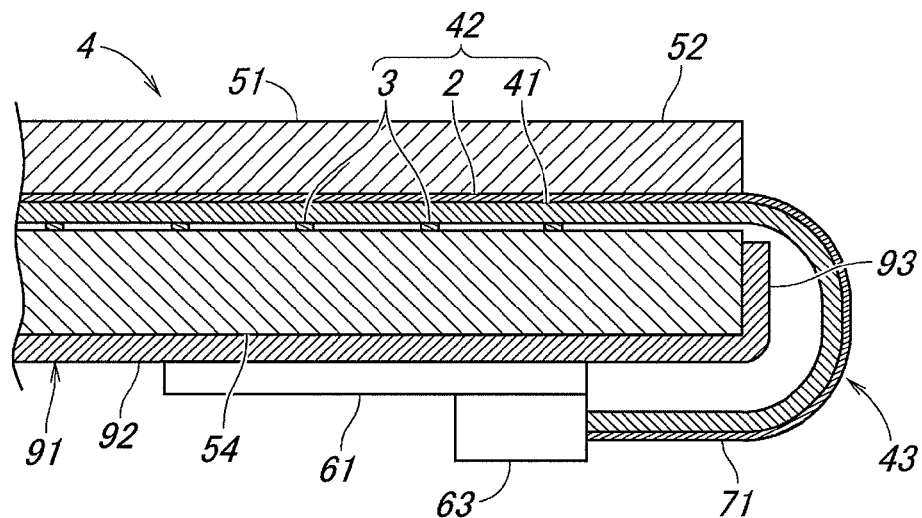
FIG. 17 is a view a view similar to FIG. 12 showing a modification of the second embodiment of the present invention.

FIG. 17 is a cross sectional view similar to FIG. 12 showing a modified embodiment of the panel main body 4. The back plate 91 is made of electro-conductive material such as steel similarly as in the previous embodiment, but comprises a main body 92 extending over the entire back surface of the intermediate plate 54 and an extension 93 which extends from the main body 92 beyond the edge of the back surface of the intermediate plate 54 and bent onto the side surface thereof. The extension 91 covers the four sides of the intermediate plate 54 so that the back plate 91 is provided with the shape of a rectangular box having an open top end.

Thereby, the stiffness of the back plate 91 is increased, and this improves the resistance of the panel assembly 4 against deformation. Furthermore, as the lead wires 71 extend along the side extension 93 as well as along the main body 92 of the back plate 91, the induction noises in the reception electrodes 3 can be further reduced. If required, the side extension 93 may cover only a part of the side surfaces of the intermediate plate 54 such as the side(s) where the transmission side lead unit 43 and/or reception side lead units 44 are located.

In particular, if the part of the lead wires 71 where the lead wires 71 merge together in the shape of a fan is located on the side extension 93 of the back plate 91, the effect of reducing induction noises is more pronouncedly varied depending on the length of the lead wires 71.

Figure 18:
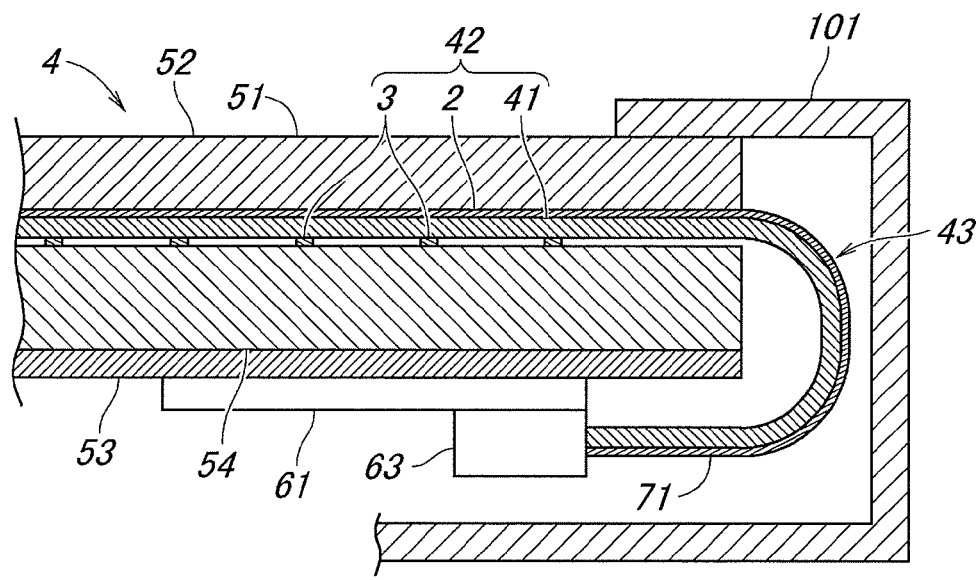
FIG. 18 is a view a view similar to FIG. 12 showing another modification of the second embodiment of the present invention.

FIG. 18 is a cross sectional view similar to FIG. 12 showing another modified embodiment of the panel main body 4. This panel main body 4 comprises a cover member 101 that is made of electro-conductive material and covers the transmission side lead unit 43 from the back side and lateral side of the electrode sheet 42. The cover member 101 is preferably made of electro-conductive plastic material or metallic material, but may also be made of plastic or other insulating material coated with an electroconductive paint.

In this embodiment, by electrically grounding the cover member 101, the lead wires 71 are electromagnetically shielded by the cover member 101 so that the reception electrodes 3 are protected from the induction noises caused by the drive current conducted by the lead wires 71.

According to the second embodiment, the induction noises induced in the reception electrodes owing to the induction caused by the drive signal for the transmission electrodes 2 conducted by the lead wires 71 can be reduced, and this technology can be beneficially used in touch panel devices of the electrostatic capacitive type, in particular the mutual capacitive type.

A touch panel device requires a large number of electrodes to be arranged next to one another at a high density, and these electrodes are attached to or formed on an insulating sheet at a close proximity to each other. When bias voltages are applied to these electrodes for a prolonged period of time, the material of one electrode may migrate to another owing to a certain electrolytic activity, and this may cause short-circuiting between adjacent electrodes. This is called as "migration".

In particular, in an electrostatic mutual capacitive type touch panel where transmission electrodes and reception electrodes are arranged on two sides of a support sheet, a pin hole that may exist in the support sheet may cause migration between the transmission electrodes and reception electrodes across the thickness of the support sheet.

Such an occurrence severely reduces the service life of the touch panel, and impairs the reliability of the touch panel device. Therefore, there is a need to prevent the problem of migration in the field of touch panels.

In a resistive membrane type touch panel, it was proposed in JP 2000-284911A (patent document 5) to apply the bias voltage that could cause migration only when a touch operation is detected by a mechanical switch. It is also known from JP 2006-39927A (patent document 6) to cease the touch position detection process when the operation condition is detected to be susceptible to migration in a resistive membrane type touch panel device.

However, these previous proposals are not satisfactory. If mechanical switches are used for touch detection, the size of the touch panel becomes undesirably great, and the manufacturing cost rises. When the touch position detection process is ceased when the operation condition is susceptible to migration in a resistive membrane type touch panel device, migration cannot be entirely prevented. If the operation condition is restricted so as not to cause migration, the touch panel could be unusable whenever the operation condition is unfavorable, and this severely restricts the convenience of the touch panel device.

Also, if the response speed of the touch panel device is low, the control unit of the touch panel device is unable to follow a rapidly moving touch position, and the touch position may be detected only as a dotted line even though the movement of the touch position is continuous. This damages the commercial acceptability of the touch panel device, and there is a need to increase the response speed of the touch panel device.

A certain circuit arrangement that can be used in association with the illustrated embodiments and resolve the above mentioned problems is described in the following with reference to FIGS. 19 to 24.

Figure 19:
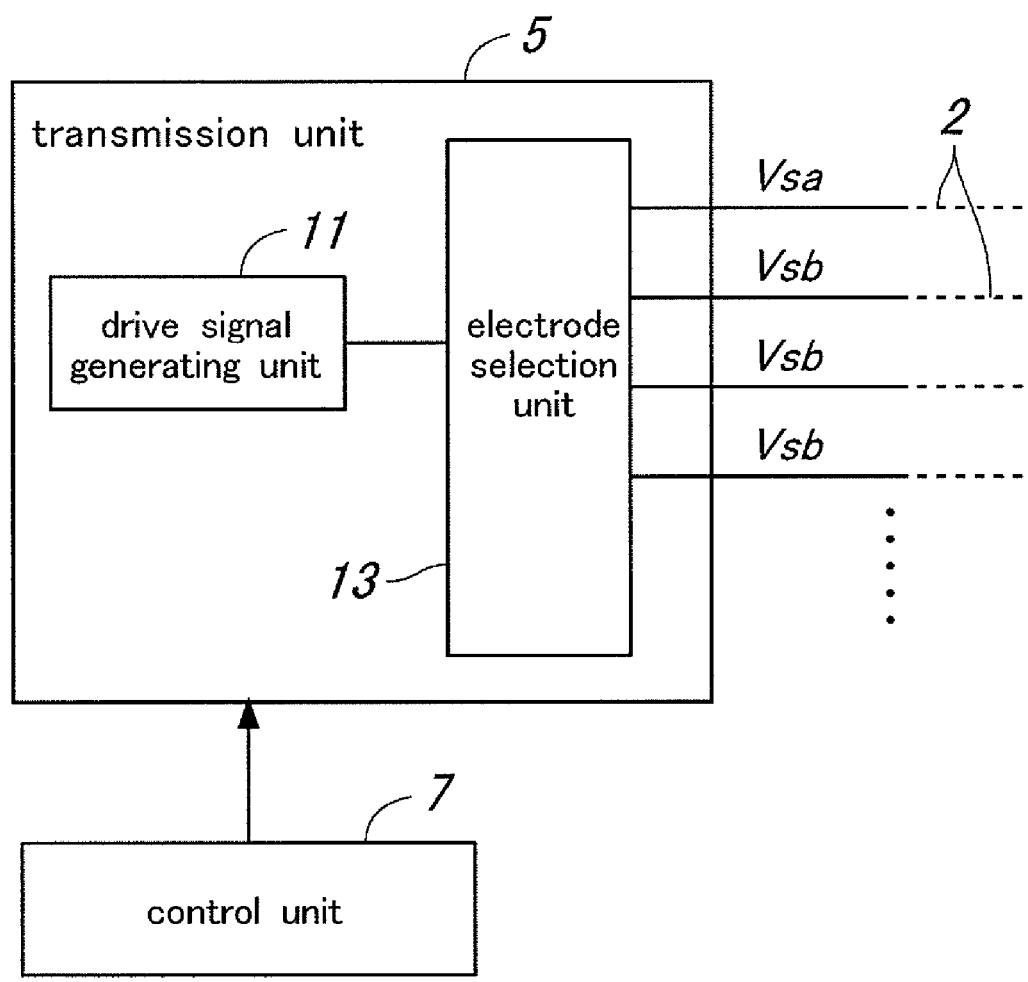
FIG. 19 is a block diagram of the transmission unit for illustrating the arrangement for reducing migration in the electrode sheet.

FIG. 19 shows an exemplary structure of the transmission unit 5. When one of the transmission electrodes 2 is selected, a select voltage Vsa consisting of a pulse signal based on a drive signal having a maximum value Vp (5 volts, for instance) is applied to the selected transmission electrode 2, and the voltage of the transmission electrode 2 can change between 0 V and the maximum value of Vp. When the transmission electrode 2 is not selected, a non-select voltage Bsb (0 V) or the ground voltage is applied to the transmission electrode.

Figure 20:
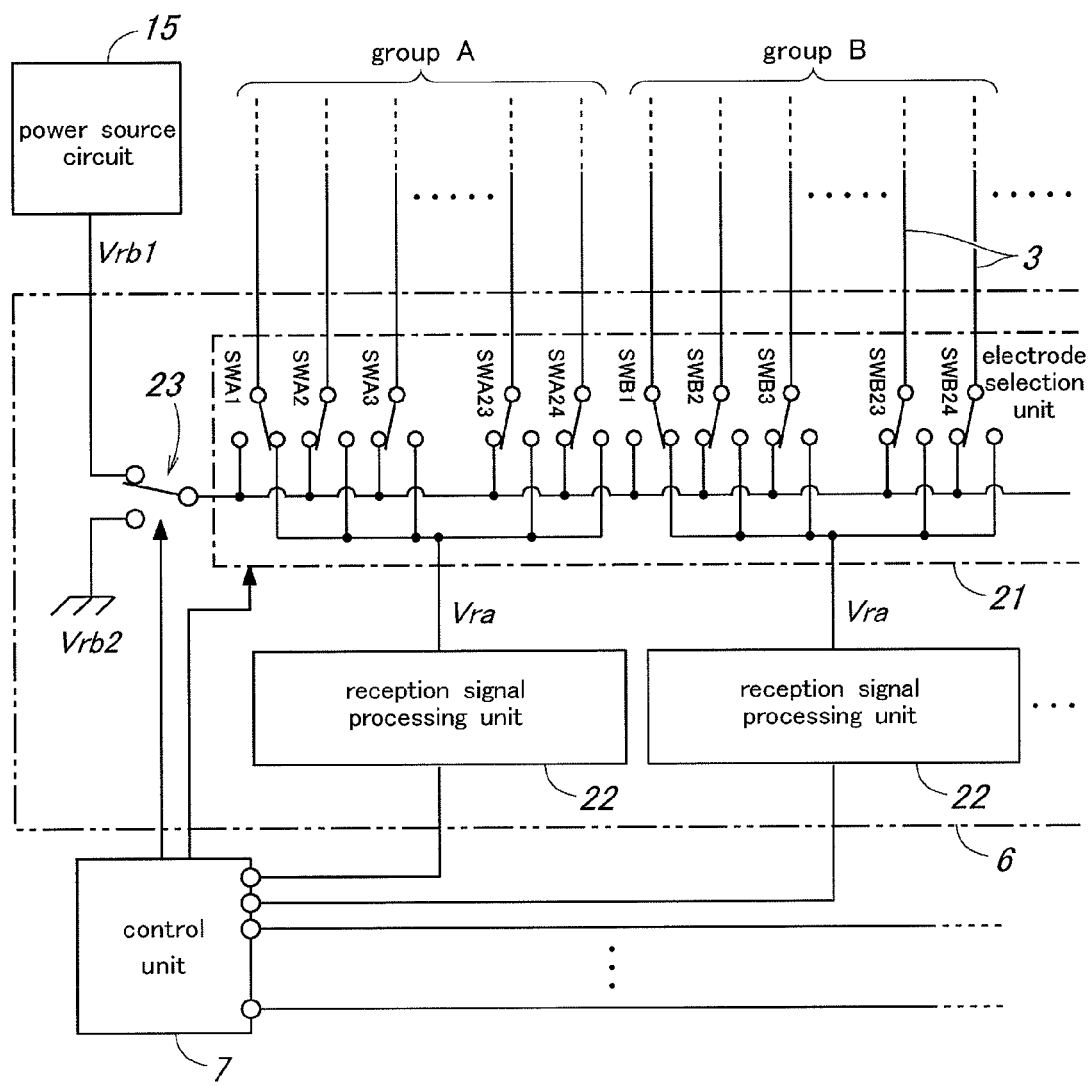
FIG. 20 is a block diagram of the reception unit for illustrating the arrangement for reducing migration in the electrode sheet.

FIG. 20 shows the reception unit 6 such as the one shown in FIG. 1. The transmission unit 6 comprises an electrode selection unit 21, a plurality of reception signal processing units 22 and a voltage switch (voltage switching unit) 23. The electrode selection unit 21 includes a switching device SW provided for each of the reception electrodes 3 so as to select one of the reception electrodes 3 at a time while the drive signal is applied to each transmission electrode, and the charge/discharge current from each reception electrode 3 is forwarded to the corresponding reception signal processing unit 22. Thereby, the charge/discharge current can be obtained from each of the intersections between the transmission electrodes 2 and reception electrodes 3.

Each switching device SW of the electrode selection unit 21 includes a pair of fixed contacts connected to the corresponding reception signal processing unit 22 and (a moveable contact of) the voltage switch 23, respectively, and a moveable contact which is connected to the corresponding reception electrode 3 so that either a select state where the reception electrode 3 is connected to the reception signal processing unit 22 or a non-select state where the reception electrode 3 is connected to the moveable contact of the voltage switch 23 can be selected at a time. Each switching device SW is controlled individually by a drive signal forwarded from the control unit 7.

The voltage switch 23 is provided with a pair of fixed contacts in addition to the moveable contact, and is configured to change the voltage of the reception electrode 3 in the non-select state. One of the fixed contacts is connected to a power source circuit 15 and the other fixed contact is electrically grounded. The moveable contact is connected to one of the fixed contacts of each switching device SW. When the moveable contact of the voltage switch 23 is switched to one of the fixed contacts connected to the power source circuit 15, a first non-select voltage Vrb1 (2.0 V, for instance) is applied to the reception electrodes 3 (non-select reception electrodes). When the moveable contact of the voltage switch 23 is switched to the other fixed contact connected to the ground, a second non-select voltage Vrb2 (0 V, for instance) is applied to the reception electrodes 3 (non-select reception electrodes).

The reception electrodes 3 and switching devices SW of the electrode selection unit 21 are divided into a plurality of groups each containing a prescribed number of reception electrodes 3 and a same number of switching devices SW which are commonly connected to one of the reception signal processing unit 22. The switching devices SW in the corresponding positions of the different groups are simultaneously switched so that one of the reception electrodes 3 in each group is put to the select state while the remaining reception electrodes in the same group are kept in the non-select state. The charge/discharge current signal of each reception electrode 3 put into the select state is forwarded to the corresponding reception signal processing unit 22.

As the switching actions of the switching devices SW are performed concurrently or in parallel to each other among the different groups so that the time required for receiving and processing the charge/discharge current signals from all of the reception electrodes 3 can be reduced. Also, as the processing of the charge/discharge current is conducted individually for each group in the reception unit 6, the need for large-capacity hardware can be avoided.

The number of the reception electrodes 3 in each group may not be the same. For instance, if there are 186 reception electrodes 3, seven of the groups A to G may each include 24 of them while the last group H includes only 18 of them.

Figure 21:
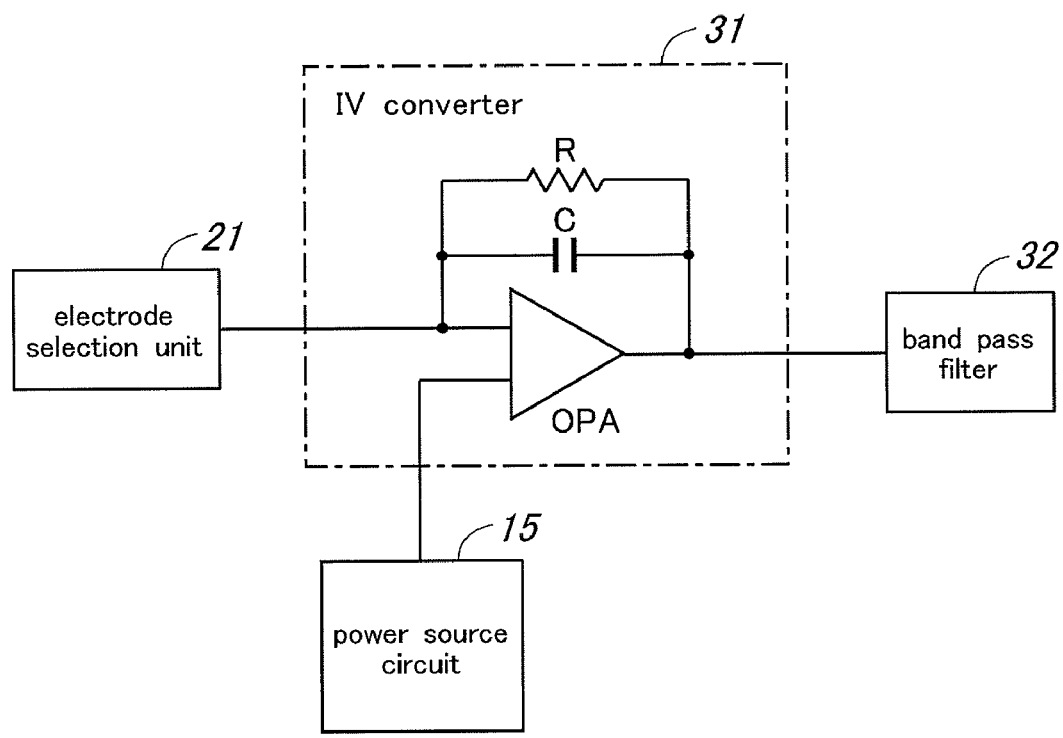
FIG. 21 is a more detailed block diagram of the IV converter of the reception signal processing unit shown in FIG. 4.

FIG. 21 shows the details of the IV converter 31 included in each reception signal processing unit 22 which has the structure illustrated in FIG. 4. The IV converter 31 comprises an operational amplifier OPA, and a parallel connection of a resistor R and a capacitor C connected in the feedback path of the operational amplifier OPA or between the inverting input end and output thereof. The operational amplifier OPA is configured to operate with a single power source, and can operate solely on the positive voltage (2.0 V, for instance) provided by the power source circuit 15. The other input or non-inverting input of the operational amplifier OPA is connected to the power source circuit 15.

In the operational amplifier OPA, the inverting input connected to one of the reception electrodes 3 via the electrode selection unit 21 is at the same voltage as the non-inverting input which is connected to the power source circuit 15. Therefore, when one of the reception electrodes 3 is selected, the reception electrode 3 is electrically connected to the IV converter 31 so that the select voltage Vra (2.0 V, for instance) which is the same as the operation voltage of the operational amplifier OPA is applied to the reception electrode 3.

FIG. 22 is a diagram showing the details of a first control mode and a second control mode which are selectively executed in the control unit 7. The first control mode consists of a high speed mode in which the first non-select voltage Vrb1 (2.0 V, for instance) is applied to the reception electrode 3 via the voltage switch 23. The second control mode consists of a low speed mode in which the second non-select voltage Vrb2 (0 V, for instance) is applied to the reception electrode 3 via the voltage switch 23. When the moveable contact of the voltage switch 23 is switched to the other fixed contact connected to the ground, a second non-select voltage Vrb2 (0 V, for instance) is applied to the reception electrodes 3. The high speed mode allows the reception electrodes to be selected at high speed, and the low speed mode allows the reception electrodes to be selected at low speed as will be described hereinafter.

As shown in FIG. 20, the voltage switch 23 selectively applies the first non-select voltage Vrb1 (2.0 V, for instance) supplied from the power source circuit 15 or the second non-select voltage Vrb2 (0 V, for instance) supplied from the ground to the non-select reception electrodes 3. The first and second control modes differ from each other in the voltage applied to each reception electrode 3 in the non-select state by the voltage switch 23, and are otherwise the same with each other.

The first non-select voltage Vrb1 which is applied to each reception electrode 3 in the non-select state is determined such that the first non-select voltage Vrb1 is about the same as the select voltage Vra (2.0 V) applied to the reception electrode 3 by connecting the reception electrode 3 with the reception signal processing unit 22. Likewise, the second non-select voltage Vrb2 which is applied to each reception electrode 3 in the non-select state is determined such that the second non-select voltage Vrb2 will be about the same as the non-select voltage Vrb (0 V) applied to the transmission electrode 2 in the non-select state.

Figure 23A:
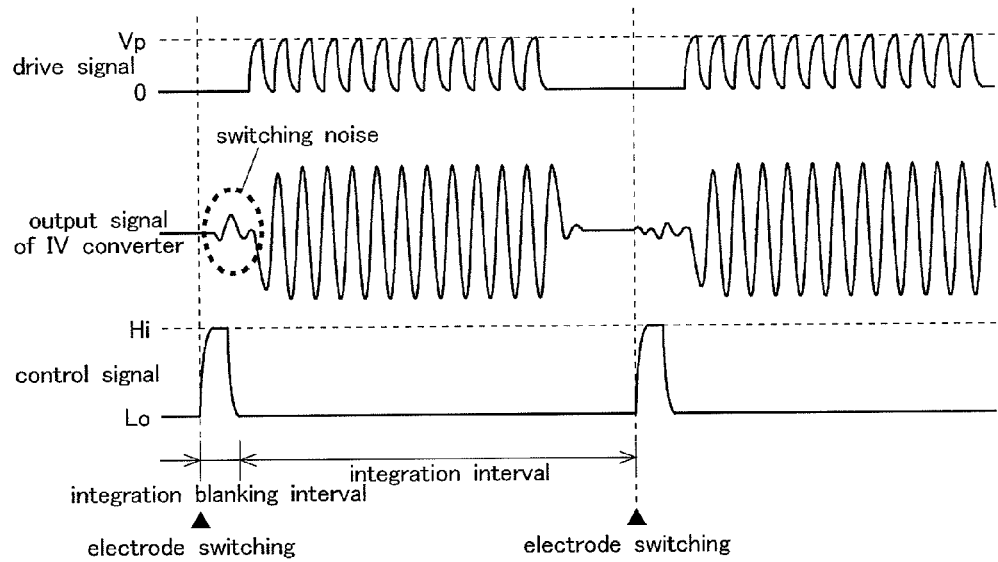
FIG. 23a is a timing chart showing the drive signal applied to the transmission electrodes, output signal of the IV converter in the transmission unit and control signal for the processing timing of the reception unit in the first control mode (high speed mode)
Figure 23B:
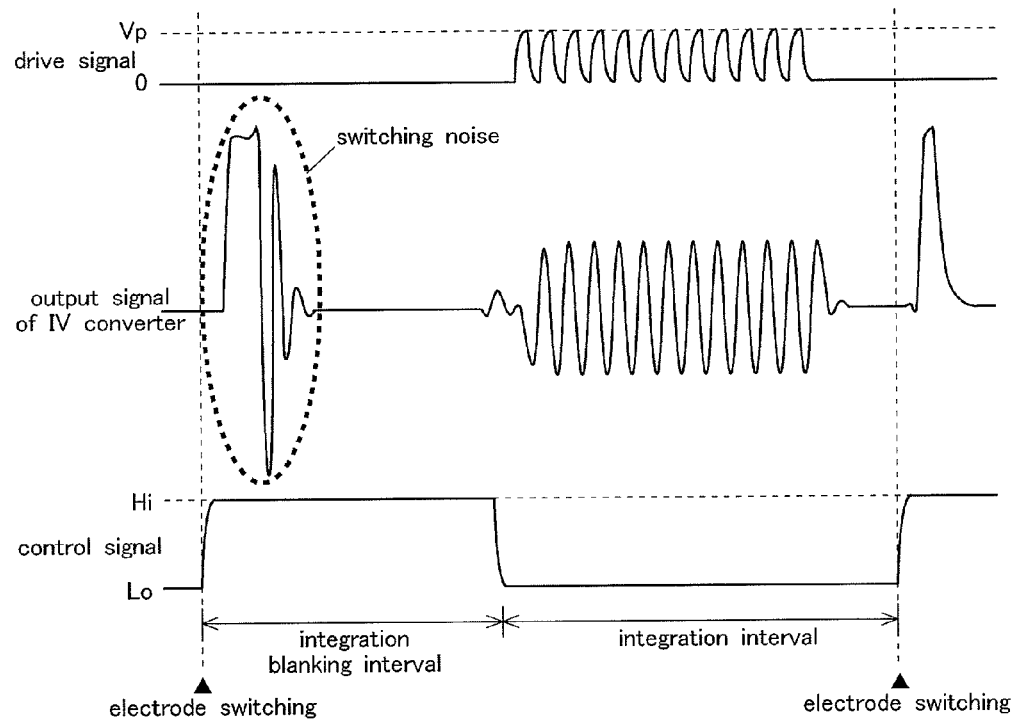
FIG. 23b is a timing chart similar to FIG. 23a in the second control mode (low speed mode)

FIG. 23a is a waveform diagram showing the drive signal applied to each transmission electrode 2, output signal of the IV converter 23 in the reception unit 6 and a control signal that determines the processing timing in the reception unit 6 in the first control mode (high speed mode). FIG. 23b shows a similar waveform diagram in the second control mode (low speed mode). The transmission unit 5 applies a drive signal (pulse signal) to each selected one of the transmission electrodes 2 one after another, and the reception unit 6 receives a charge/discharge current signal from each selected one of the reception electrodes 3 one after another during the time a drive signal is applied to each selected one of the transmission electrodes 2. The received charge/discharge current signal is IV converted into a voltage level signal. During this process, a plurality (12, in the illustrated embodiment) of pulses are applied to each transmission electrode 2 for each intersection of transmission electrodes 2 and reception electrodes 3 at a time.

The electrode selection unit 21 of the reception unit 6 changes the selected transmission electrode 2 one after another according to the control signal supplied by the control unit 7. In particular, as the control signal changes from a low level to a high level, the switching device SW is switched, and the next transmission electrode 3 is selected. The integration unit 34 performs an integration process according to the control signal. In particular, the integration process is initiated as the control signal changes from a high level to a low level, and is completed as the control signal changes from a low level to a high level.

FIG. 23a represents the first control mode or the high speed mode. Each reception electrode 3 in the non-selected state is at the first non-select voltage Vrb1 which is the same as the select voltage Vra. In this case, as the voltage level of each reception electrode remains the same in both the select state and non-select state, almost no switching noise is generated when the reception electrodes are selected one after another. Therefore, the switching action is not required to be suspended for any period of time (integration blanking interval), and the switching of the reception electrodes 3 can be effected at a rapid rate or at a high speed.

FIG. 23b represents the second control mode or the low speed mode. When each reception electrode 3 is in the non-select state, the second non-select voltage Vrb2 (0V) which is the same as the non-select voltage of the transmission electrode 2 is applied to the reception electrode 3. In this case, as there is a large difference in the voltage of each reception electrode 3 depending on if the reception electrode is in the select state or in the non-select state, a relatively large switching noise may be generated when the reception electrodes are selected one after another, and this noise may contaminate the integration value thereby causing an error in detecting the touch position. Therefore, in the second control mode, the switching timing is determined such that a prescribed waiting time period (integration blanking interval) of an adequate duration required for blanking the switching noise is included in the switching timing. Thereby, an error in detecting the touch position due to the switching noise can be avoided. However, a longer time period is required for switching the reception electrodes 3, and the speed of touch position detection decreases.

In the illustrated embodiment, there are 120 transmission electrodes 2. Therefore, as shown in FIG. 22, each transmission electrode 2 is in the select state only for a 120th of each cycle time. Therefore, each transmission electrode 2 is at the select voltage Vsa (0 to 5 V) a 120th of the time, and is at the non-select voltage Vsb (0 V) or in the non-select state for the remaining 119 120ths of the time. Each transmission electrode 2 in the non-select state is given the non-select voltage Vsb (0 V) which is the same as the ground voltage. Therefore, each transmission electrode 2 is at 0 V most of the time.

In the illustrated embodiment, each group of the reception electrodes 3 contains 24 reception electrodes 3. Therefore, each reception electrode 3 is in the select state only for a 24th of each cycle time. Therefore, each reception electrode 3 is at the select voltage Vra (2 V) a 24th of the time, and is in the non-select state for the remaining 23 24ths of the time. In the non-select state, either the first non-select voltage Vrb1 (2 V) (high speed mode) or second non-select voltage Vrb2 (0 V) (low speed mode) is applied to the reception electrode 3 depending on the control mode.

In the first control mode (high speed mode), as the first non-select voltage Vrb1 (2 V) is applied to the reception electrode 3, the resulting voltage difference between the transmission electrode 2 and reception electrode 3 may create the problem of migration. Therefore, it is desirable to minimize the duration of the first control mode as much as possible.

On the other hand, in the second control mode (low speed mode), when the reception electrode 3 is in the non-select state, the second non-select voltage Vrb2 (0 V) is applied to the reception electrode 3 so that the reception electrode 3 and transmission electrode 2 are both in the non-select state, and there is no voltage difference between the reception electrode 3 and transmission electrode 2. Furthermore, the transmission electrode 2 is in the non-select state for 119 120ths of the time, and the reception electrode 3 is in the non-select state for 23 24ths of the time so that there is no voltage difference between the reception electrode 3 and transmission electrode 2 most of the time. Therefore, the problem of migration can be safely avoided.

When one of the reception electrodes 3 is selected, the select voltage Vra (2 V) is applied to the reception electrode 3, and a voltage difference develops between the transmission electrode 2 and reception electrode 3. However, this occurs only a 24th of the time, and is therefore relatively insignificant.

Figure 24:
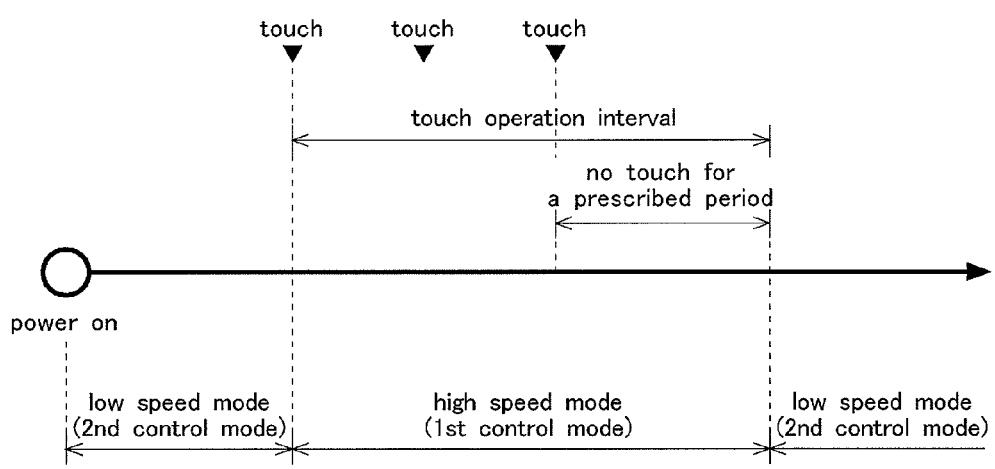
FIG. 24 is a timing chart showing the transition between the first and second control modes.

FIG. 24 illustrates the details of the first and second control modes discussed earlier in connection with FIG. 22. The control unit 7 selects the first control mode (high speed mode) upon detecting a touch operation interval where touch operation is repeatedly executed, and otherwise selects the second control mode (low speed mode).

In practice, when using a touch panel device, a user simply looks at the image projected on the touch surface most of the time, and performs a touch operation only for short periods of time. Therefore, by invoking the first control mode which may suffer from the problem of migration only during a touch operation interval, and the second control mode which does no suffer from the problem of migration during the remaining majority of time, the problem of migration can be effectively avoided without impairing the convenience of the touch panel device in any way.

In particular, the control unit starts operation in the second control mode following the activation of the touch panel device, and the first control mode is selected only when a touch operation interval is detected. When no touch operation is detected for a prescribed time period while the first control mode is being selected, the first control mode is replaced by the second control mode. Thereafter, the first control mode is resumed whenever a touch operation is detected.

In this manner, the touch operation interval during which a touch operation is executed can be appropriately determined, and the duration of the first control mode that may suffer from the problem of migration can be minimized.

In the foregoing embodiment, the first non-select voltage Vrb1 was equal to the non-select voltage Vra of the reception electrode 3, and the second non-select voltage Vrb2 was equal to the non-select voltage Vsb of the transmission electrode 2, but these voltages are not required to be exactly the same but may be only approximately the same for the purpose of the present invention. If the first non-select voltage Vrb 1 is reasonably close to the non-select voltage Vra of the reception electrode 3, the switching noise can be significantly reduced. If the second non-select voltage Vrb2 is reasonably close to the non-select voltage Vsb of the transmission electrode 2, the problem of migration can be adequately avoided.

According to the foregoing embodiment of the touch panel device, migration can be avoided without increasing the manufacturing cost or impairing the convenience of the touch panel device. Also, the speed of the touch position detection can be increased whenever possible. This embodiment is particularly useful when used in conjunction with electrostatic capacitive type, in particular mutual capacitive type touch panel devices.

Thus, according to a certain aspect of the present invention, the touch panel device comprises a panel main body including a grid array of transmission electrodes and reception electrodes and defining a touch surface; a transmission unit configured to apply a drive signal to each transmission electrode; a reception unit configured to receive a charge/discharge current signal generated in each reception electrode in response to the drive signal applied to the transmission electrode, and thereby generate a level signal for each intersection between the transmission electrodes and reception electrodes; and a control unit configured to identify a touch position according to the level signal generated by the reception unit; wherein the reception unit includes a voltage switch for changing the voltage applied to each non-select reception electrode between a first voltage and a second voltage, the first voltage being substantially equal to a voltage applied to each select reception electrode and/or the second voltage being substantially equal a voltage applied to each non-select transmission electrode.

By applying a non-select voltage substantially equal to the select voltage of the reception electrode to each non-select reception electrode, the switching noise when selecting each reception electrode can be minimized, and the switching of the reception electrode one after another can be performed without waiting for the settling of the switching noise, and hence can be performed at high speed. By applying a non-select voltage substantially equal to the non-select voltage of the transmission electrodes to each non-select reception electrode, the voltage difference between the transmission electrodes and reception electrodes can be minimized, and the problem of migration between the transmission electrodes and reception electrodes can be avoided. Therefore, the prevention of migration and a high speed touch position detection can be accomplished at the same time without increasing the manufacturing cost or causing any inconvenience to the user of the touch panel device.

The control unit may be configured to operate selectively in a first control mode where the first voltage is applied to each non-select reception electrode and switching of the reception electrodes is performed at a comparatively high speed, and a second control mode where the second voltage is applied to each non-select reception electrode and switching of the reception electrodes is performed at a comparatively low speed.

The touch position detection can be performed at a high rate in the first control mode because the switching noise is minimized, and the touch position detection can be performed without waiting the switching noise to subside or otherwise settles to a low level. In the second control mode, the touch position detection may be delayed until the switching noise have subsided or otherwise settled to a low level so that an accurate touch position detection may be ensured.

The control unit may be configured to detect a touch operation interval in which a touch operation is repeatedly executed, the control unit selecting the first control mode when the touch operation interval is detected and otherwise selecting the second control mode.

Typically, the user of the touch panel device watches the image projected on the touch surface most of the time, and touches the touch surface only for short periods of time. By limiting the use of the first control mode only during the time of touch panel operation, the problem of migration can be avoided while allowing the user to take full advantage of the high speed touch position detection which the touch panel device is capable of.

The control unit may be configured to operate in the second control mode upon power up, and select the first control mode when a touch operation is detected, the control unit resuming the second control mode when a touch operation is not detected for a prescribed time period.

Thereby, the selection of the two control modes can be made in a highly advantageous manner.

Although the present invention has been described in terms of preferred embodiments thereof, it is obvious to a person skilled in the art that various alterations and modifications are possible without departing from the scope of the present invention which is set forth in the appended claims.

The contents of the original Japanese patent applications on which the Paris Convention priority claim is made for the present application as well as the contents of the prior art references mentioned in this application are incorporated in this application by reference.

The invention claimed is:

1. A touch screen device comprising:
 a panel main body including a grid array of transmission electrodes and reception electrodes and defining a touch surface;
 a transmitter configured to apply a drive signal to each transmission electrode;
 a receiver configured to receive a charge/discharge current signal generated in each reception electrode in response to the drive signal applied to the transmission electrode, and thereby generate a level signal for each intersection between the transmission electrodes and reception electrodes;
 a lead unit including a plurality of lead wires connecting the transmission electrodes to the transmission unit, a length of each lead wire varying depending on a positional relationship between each lead wire and the transmission unit; and
 CR time constant elements connected to the lead unit to adjust CR time constants of the transmission electrodes, the CR time constant of each time constant element being selected to be greater as a length of a lead wire for the corresponding transmission electrode increases.

2. The touch screen device according to claim 1, wherein each CR time constant element comprises a CR circuit including a resistive component and a capacitive component.

3. The touch screen device according to claim 1, wherein the transmission electrodes are divided into a plurality of groups, and the transmission electrodes of each group share a same CR time constant element.

4. The touch screen device according to claim 1, wherein the transmission electrodes are divided into a plurality of groups, and the transmission electrodes of each group share a same CR time constant.

5. The touch screen device according to claim 1, wherein the panel main body includes an electrode sheet comprising an electrically insulating support sheet supporting the transmission electrodes and reception electrodes on opposite sides of the support sheet, and the support sheet is provided with an extension that supports lead wires extending from the transmission electrodes on a corresponding side thereof, an electro-conductive layer provided on a side of the extension opposite from the side supporting the lead wires and electrically grounded so that the CR time constant element provided by a part of each lead wire opposing the electro-conductive layer.

6. The touch screen device according to claim 5, wherein the lead wires extend in a fan-shaped manner on the extension of the support sheet.

7. The touch screen device according to claim 5, wherein the extension is provided with a trapezoidal shape having a base side connected to a main part of the support sheet, and each lead wire includes an oblique section extending obliquely with respect to the corresponding transmission electrode in a base end region of the extension and a parallel section extending in parallel with the corresponding transmission electrode in a free end region of the extension.

8. The touch screen device according to claim 5, wherein the support sheet comprises an additional extension that supports lead wires extending from the reception electrodes on a corresponding side thereof, an electro-conductive layer being provided on a side of the additional extension opposite from the side supporting the lead wires and electrically grounded.

9. The touch screen device according to claim 5, wherein the electro-conductive layer comprises a solid layer of electro-conductive material.

10. The touch screen device according to claim 5, wherein the electro-conductive layer comprises a mesh layer of electro-conductive material.

11. The touch screen device according to claim 5, wherein the lead wires are configured as integral extensions of the transmission electrodes and reception electrodes.

12. The touch screen device according to claim 1, wherein the panel main body comprises an electrode sheet including an electrically insulating support sheet supporting the transmission electrodes and reception electrodes on opposite sides of the support sheet, and an electroconductive back plate positioned over a rear surface of the electrode sheet, the transmission unit being attached to a back side of the back plate; and wherein the support sheet is provided with an extension that supports lead wires extending from the transmission electrodes on a corresponding side thereof, and after being bent against the back side of the back plate, is connected to the transmission unit so that the CR time constant element is provided by a part of each lead wire opposing the back plate.

13. The touch panel device according to claim 12, wherein the extension is provided with a trapezoidal shape having a base side connected to a main part of the support sheet, and each lead wire includes an oblique section extending obliquely with respect to the corresponding transmission electrode in a base end region of the extension and a parallel section extending in parallel with the corresponding transmission electrode in a free end region of the extension; and wherein at least part of the oblique sections of the lead wires are bent against the back side of the back plate.

14. The touch panel device according to claim 12, wherein the panel main body further includes an intermediate plate interposed between the support sheet and back plate, and the back plate is provided with a side extension extending along a side of the intermediate plate.

* * * * *